US00RE40817E

(19) United States
(12) Reissued Patent
Krivoshein et al.

(10) Patent Number: US RE40,817 E
(45) Date of Reissued Patent: Jun. 30, 2009

(54) PROCESS CONTROL SYSTEM INCLUDING AUTOMATIC SENSING AND AUTOMATIC CONFIGURATION OF DEVICES

(75) Inventors: Ken D. Krivoshein, Elgin, TX (US); Dan D. Christensen, Austin, TX (US)

(73) Assignee: Fisher-Rosemount Systems, Inc., Austin, TX (US)

(21) Appl. No.: 10/037,019

(22) Filed: Nov. 9, 2001

Related U.S. Patent Documents

Reissue of:
(64) Patent No.: 5,980,078
Issued: Nov. 9, 1999
Appl. No.: 08/799,966
Filed: Feb. 14, 1997

(51) Int. Cl.
*G06N 5/00* (2006.01)

(52) U.S. Cl. ..... 700/1; 706/45
(58) Field of Classification Search ..... 700/1, 700/2, 4, 83; 710/104, 105; 713/1
See application file for complete search history.

(56) References Cited

U.S. PATENT DOCUMENTS 4,302,820 A 11/1981 Struger et al. ..... 395/598

(Continued)

FOREIGN PATENT DOCUMENTS

| | | | |
|---|---|---|---|
| DE | 0 522 590 | 1/1993 | ..... 19/417 |
| GB | 2 208 553 | 4/1989 | ..... 19/18 |
| WO | WO 95/04314 | 2/1995 | ..... 19/42 |

OTHER PUBLICATIONS

Blackwell, The benefits won't kick–in immediately (Microsoft Windows 95 operating system's multimedia benefits), Computing Canada, v21, n18, p. 36(2), Sep. 1995.
Baldasserini, Denmac delivers LAN stats (Denmac Systems Inc's TrenData 2.0), Computer Shopper, v15, n6, p.613(1), Jun. 1995.

(Continued)

*Primary Examiner*—Wilbert L Starks, Jr.
(74) *Attorney, Agent, or Firm*—Marshall, Gerstein & Borun LLP

(57) ABSTRACT

A digital control system with a predetermined configuration automatically senses the connection to a network of a digital device that is not included in the predetermined configuration. The digital device is assigned temporary address information and placed in a temporary state, called a standby state, in which the digital device supplies information to the digital control system allowing a user to access the digital device including access of device information and configuration parameters. Using the device information and configuration parameters, a user selectively commissions the digital device by assigning a physical device tag, a device address, and a device identification, and installing a control strategy to the digital device, thereby placing the digital device in an operational state in communication with the digital control system. In the standby state, a user interrogates to determine the type of device that is attached, determines the role of the device in the context of the digital control system, assigns a physical device tag that assigns the determined role to the device, and verifies connection of the device to the network. Also in the standby state, the user initiates other applications applied to the device, including calibration of the device and configuring the device within the overall control scheme of the digital control system.

22 Claims, 18 Drawing Sheets

U.S. PATENT DOCUMENTS

| | | | | | |
|---|---|---|---|---|---|
| 4,663,704 | A | | 5/1987 | Jones et al. | 364/188 |
| 4,672,530 | A | | 6/1987 | Schuss | 364/133 |
| 4,689,786 | A | | 8/1987 | Sidhu et al. | 370/255 |
| 4,916,610 | A | | 4/1990 | Bapat | 395/708 |
| 5,006,992 | A | | 4/1991 | Skeirik | 706/58 |
| 5,063,523 | A | | 11/1991 | Vrenjak | 395/200.53 |
| 5,129,087 | A | | 7/1992 | Will | 395/704 |
| 5,134,574 | A | | 7/1992 | Beaverstock et al. | 702/84 |
| 5,155,842 | A | | 10/1992 | Rubin | 395/114 |
| 5,307,346 | A | | 4/1994 | Fieldhouse | 370/254 |
| 5,311,562 | A | | 5/1994 | Palusamy et al. | 376/215 |
| 5,371,895 | A | | 12/1994 | Bristol | 395/705 |
| 5,432,711 | A | | 7/1995 | Jackson et al. | 364/131 |
| 5,442,639 | A | | 8/1995 | Crowder et al. | 371/20.1 |
| 5,444,851 | A | | 8/1995 | Woest | 709/222 |
| 5,471,190 | A | | 11/1995 | Zimmermann | 340/310.01 |
| 5,471,461 | A | | 11/1995 | Engdahl et al. | 370/252 |
| 5,475,856 | A | | 12/1995 | Kogge | 712/20 |
| 5,481,741 | A | | 1/1996 | McKaskle et al. | 345/522 |
| 5,485,620 | A | | 1/1996 | Sadre et al. | 395/710 |
| 5,491,791 | A | | 2/1996 | Glowny et al. | 714/26 |
| 5,493,534 | A | | 2/1996 | Mok | 365/226 |
| 5,504,902 | A | | 4/1996 | McGrath et al. | 395/707 |
| 5,513,095 | A | | 4/1996 | Pajonk | 364/131 |
| 5,519,706 | A | | 5/1996 | Bantz et al. | 455/435 |
| 5,519,878 | A | | 5/1996 | Dolin, Jr. | 395/200.5 |
| 5,524,269 | A | | 6/1996 | Hamilton et al. | 710/9 |
| 5,526,489 | A | | 6/1996 | Nilakantan et al. | 395/200.58 |
| 5,530,643 | A | | 6/1996 | Hodorowski | 364/191 |
| 5,549,137 | A | | 8/1996 | Lenz et al. | 137/486 |
| 5,550,980 | A | | 8/1996 | Pascucci et al. | 709/223 |
| 5,566,320 | A | | 10/1996 | Hubert | 711/147 |
| 5,566,346 | A | | 10/1996 | Andert et al. | 364/146 |
| 5,576,946 | A | | 11/1996 | Bender et al. | 364/146 |
| 5,596,723 | A | | 1/1997 | Romohr | 395/200.52 |
| 5,623,592 | A | | 4/1997 | Carlson et al. | 345/348 |
| 5,675,748 | A | * | 10/1997 | Ross | 710/104 |
| 5,682,476 | A | | 10/1997 | Tapperson et al. | 370/225 |
| 5,694,335 | A | | 12/1997 | Hollenberg | 395/187.01 |
| 5,701,411 | A | | 12/1997 | Tran et al. | 395/200.8 |
| 5,706,007 | A | | 1/1998 | Fragnito | 341/155 |
| 5,768,119 | A | * | 6/1998 | Havekost et al. | 700/4 |
| 5,801,942 | A | * | 9/1998 | Nixon et al. | 700/83 |
| 5,828,851 | A | * | 10/1998 | Nixon et al. | 710/105 |
| 5,862,052 | A | * | 1/1999 | Nixon et al. | 713/1 |
| 5,909,368 | A | * | 6/1999 | Nixon et al. | 700/2 |

OTHER PUBLICATIONS

PCT/US98/01573 International Search Report, dated Nov. 25, 1998.

S.N. Chau, et al., "A Multi–Mission Space Avionics Architecture," Proc. 1996 IEEE Aerospace Applications Conference, vol. 1, pp. 165–176, Feb. 1996.

John R. Gyorki, "PLC's drive standard buses", Machine Designs, May 11, 1995, pp. 83–90.

Moore Products Co., "Control System", Power Apr. 1995, +–p. 11 4, vol. 139, No. 4, Copyright 1995, McGraw–Hill, Inc.

Moore Products Co., "apacs Control System", Power Jun. 1995, p. 81, vol. 139, No. 6, Copyright 1995,McGraw–Hill, Inc.

Robert R. Lyons, "New Telemecanique Programmable Controllers Feature Multiple Programming Languages", Telemacanique, Arlington Heights, IL, Feb. 11, 1995.

Clifford J. Peshek et al., "Recent Developments and Future Trends in PLC Programming Languages and Programming Tools for Real–Time Control", IEEE Cement Industry Technical Conference, May 1993, Toronto, Canada, pp. 219–230.

C. K. Duffer et al., "High–Level Control Language Customized Application Programs", Power Technologies, Inc., IEEE Computer Applications in Power, © Apr. 1991, pp. 15–18.

H.J. Beestermoller et al., "An online programmable Multiple–Loop Controller for Distributed Systems", © 1994 IEEE, pp. 15–20.

Foundation Fieldbus, *FF–001, Communications Technical Specifications*, © 1994–1996.

Foundation Fieldbus, *FF–002, Communications Technical Specifications*, © 1994–1996.

* cited by examiner

PROCESS CONTROL SYSTEM INCLUDING AUTOMATIC SENSING AND AUTOMATIC CONFIGURATION OF DEVICES

Matter enclosed in heavy brackets [ ] appears in the original patent but forms no part of this reissue specification; matter printed in italics indicates the additions made by reissue.

CROSS-REFERENCE TO RELATED APPLICATIONS

This application is related to of copending application by Nixon et al., entitled "Process Control System Including Automatic Sensing and Automatic Configuration of Devices", filed on Apr. 12, 1996, U.S. patent application Ser. No. 08/631,519, which application is hereby incorporated by reference in its entirety, including any appendices and references thereto.

This application is related to copending application by Nixon et al., entitled "A Process Control System Using Standard Protocol Control of Standard Devices and Non-standard Devices", filed on Apr. 12, 1996, U.S. patent application Ser. No. 08/631,862, which application is hereby incorporated by reference in its entirety, including any appendices and references thereto.

This application is related to copending application by Nixon et al., entitled "A Process Control System for Versatile Control of Multiple Process Devices of Various Device Types", filed on Apr. 12, 1996, U.S. patent application Ser. No. 08/631,521, which application is hereby incorporated by reference in its entirety, including any appendices and references thereto.

This application is related to copending application by Nixon et al., entitled "Process Control System for Monitoring and Displaying Diagnostic Information of Multiple Distributed Devices", filed on Apr. 12, 1996, U.S. patent application Ser. No. 08/631,557, which application is hereby incorporated by reference in its entirety, including any appendices and references thereto.

This application is related to copending application by Nixon et al., entitled "A Process Control System User Interface Including Selection of Multiple Control Languages", filed on Apr. 12, 1996, U.S. patent application Ser. No. 08/631,517, which application is hereby incorporated by reference in its entirety, including any appendices and references thereto.

This application is related to copending application by Dove, entitled "System for Assisting Configuring a Process Control Environment", filed on Apr. 12, 1996, U.S. patent application Ser. No. 08/631,458, which application is hereby incorporated by reference in its entirety, including any appendices and references thereto.

This application is related to copending application by Nixon et al., entitled "Process Control System Using a Control Strategy Implemented in a Layered Hierarchy of Control Modules", filed on Apr. 12, 1996, U.S. patent application Ser. No. 08/631,520, which application is hereby incorporated by reference in its entirety, including any appendices and references thereto.

This application is related to copending application by Dove et al., entitled "System for Configuring a Process Control Environment", filed on Apr. 12, 1996, U.S. patent application Ser. No. 08/631,863, which application is hereby incorporated by reference in its entirety, including any appendices and references thereto.

This application is related to copending application by Nixon et al., entitled "A Process Control System Using a Process Control Strategy Distributed Among Multiple Control Elements", filed on Apr. 12, 1996, U.S. patent application Ser. No. 08/631,518, which application is hereby incorporated by reference in its entirety, including any appendices and references thereto.

This application is related to copending application by Nixon et al., entitled "Improved Process System", filed on Apr. 12, 1996, U.S. Provisional patent application Ser. No. 60/017,700, which application is hereby incorporated by reference in its entirety, including any appendices and references thereto.

BACKGROUND OF THE INVENTION

1. Field of the Invention

This invention relates to process control systems. More specifically, the present invention relates to a process control system which automatically senses connection of process devices and automatically configures the devices when sensed.

2. Description of the Related Art

Present-day process control systems use instruments, control devices and communication systems to monitor and manipulate control elements, such as valves and switches, to maintain at selected target values one or more process variables, including temperature, pressure, flow and the Eke. The process variables are selected and controlled to achieve a desired process objective, such as attaining the safe and efficient operation of machines and equipment utilized in the process. Process control systems have widespread application in the automation of industrial processes such as the processes used in chemical, petroleum, and manufacturing industries, for example.

Control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process.

Many process control systems include local field devices such as valves, motors, regulators and the like which are responsive to specific control protocols, such as Profibus, Fieldbus, CAN and the like, to implement various control function routines. Accordingly, these controllers are responsive to certain standard control protocols to implement control functionality in the field. The use of such standard control signal protocols can reduce the time and effort of developing a control system because a designer can use the same types of control signals from all devices responsive to the control protocol.

In a conventional process control system, the local field devices are typically configured in the field, often by individually programming the local field devices using a hand-held field programmer. Individual programming of the field devices is time consuming and inefficient and often leads to incompatibilities between the device configuration and the configuration of other devices and controllers in the process control system since a global view of the system is more difficult to sustain when individual devices are programmed independently. Usage of individual programming devices is inconvenient since multiple different programming devices typically must be used to program respective different field devices.

Furthermore, local device failures, including temporary failures or local power disruptions, interrupt operations of the entire control system, sometimes causing extended downtime since each failing device must be reconfigured locally.

What is needed is a process control system that allows individual field devices to be configured without local, independent programming. What is also needed is a process control system allowing configuration of the global system from a location remote from the local field devices so that a compatible global configuration is achieved while allowing peripheral elements which are configured in a suitable global manner, to operate independently to achieve control functionality.

Configuration of the global system is based on parameters that describe the particular field devices that make up the system. However, the control protocols for communicating with the field devices may be insufficient to convey parameters that are sufficient to configure the system. For example, the system management specification of the Fieldbus protocol defines three states for a device including an INITIALIZED state, an UNINITIALIZED state, and a system management operational (SM OPERATIONAL) state. The three defined states are sufficient to describe the behavior of a device from the perspective of the system management, but are not adequate for describing a device from the perspective of either the fieldbus interface or software engineering tools for analyzing, controlling, or displaying the status of a device. This insufficiency is highly notable when configuration involves the operation of commissioning a device that is attached to the Fieldbus link in an UNINITIALIZED state.

What is further needed is a process control system that differentiates between Fieldbus device states to support automatic sensing of devices and online address assignment of devices.

SUMMARY OF THE INVENTION

In accordance with an aspect of the present invention, a control system controls one or more interconnected devices according to a defined control configuration. The control system automatically senses a device that is connected to the control system but not included in the control configuration definition. The control system supplies initial interconnect information to the connected device sufficient to upload configuration parameters from the device to the control system.

In accordance with a further aspect of the present invention, a digital control system with a predetermined configuration automatically senses the connection to a network of a digital device that is not included in the predetermined configuration. The digital device is assigned temporary address information and placed in a temporary state, called a standby state, in which the digital device supplies information to the digital control system allowing a user to access the digital device including access of device information and configuration parameters. Using the device information and configuration parameters, a user selectively commissions the digital device by assigning a physical device tag, and a device address, and installing a control strategy to the digital device, thereby placing the digital device in an operational state in communication with the digital control system. In the standby state, a user interrogates to determine the type of device that is attached, determines the rule of the device in the context of the digital control system assigns a physical device tag that assigns the determined role to the device, and verifies connection of the device to the network. Also in the standby state, the user initiates other applications applied to the device, including calibration of the device and configuring the device within the overall control scheme of the digital control system.

In accordance with another aspect of the present invention, a control system differentiates between Fieldbus device states beyond the states defined according to the Fieldbus standard specification. The control system sets a physical device tag equal to the device identification (ID) for the devices that do not have tags, while the device is autosensed. A device attached to the Fieldbus link with the physical device tag set equal to the device ID is controlled in the manner of an UNINITIALIZED device.

In accordance with an aspect of the present invention, automatic sensing of field devices is extended beyond a conventional input/output level to the configuration of Fieldbus devices by a digital control system.

In accordance with an embodiment of the present invention, a digital control system with a predetermined configuration automatically senses the connection to a network of a digital device that is not included in the predetermined configuration. The digital device is placed in a temporary state, called a standby state, in which the digital device supplies information to the digital control system allowing a user to access the digital device, including access of device information and configuration parameters. The digital control system formats and displays the device information upon request by a user. The digital control system program also includes an automatic configuration program that responds to sensing of a new controller by automatically configuring the input/output (I/O) subsystem. The user adds a new controller without setting any physical switches or nodes. A user optionally supplies configuration information for a device into a database, prior to connection of a device. Upon connection of the device, the device is automatically sensed and configured using the database configuration information, without setting of physical switches on the devices.

In accordance with another embodiment of the present invention, a process control system includes a process, a plurality of controllers connected to the process, a workstation connected to the plurality of controllers and including a user interface, and a software system including a network operating system, a user interface, and implementing an automatic sensing routine. The automatic sensing routine includes an executable logic for automatically sensing a connection of a device to a network and placing the device in a state accessible for communication by a user via a user interface. In the accessible state, a user commissions the device and selectively initiates device-related applications.

Many advantages are achieved by the described system and method. One advantage is that configuration of a control system is greatly facilitated. The physical connection of a device to the network automatically initiates inclusion of the connected device into the control system. The described system and method advantageously facilitates conformity between the configuration of a network and the physical interconnections of the network that serves as the basis for the configuration. The described system and method assist programming of field devices from a remote location so that individual field setting of the devices, using a local setting device, is not necessary. The system and method support central programmability is highly useful to reduce system management costs and for reducing downtime of a process control system. A further advantage is that configuration of the entire system, rather setting of individual devices, leads to a system in which individual system settings are highly compatible.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
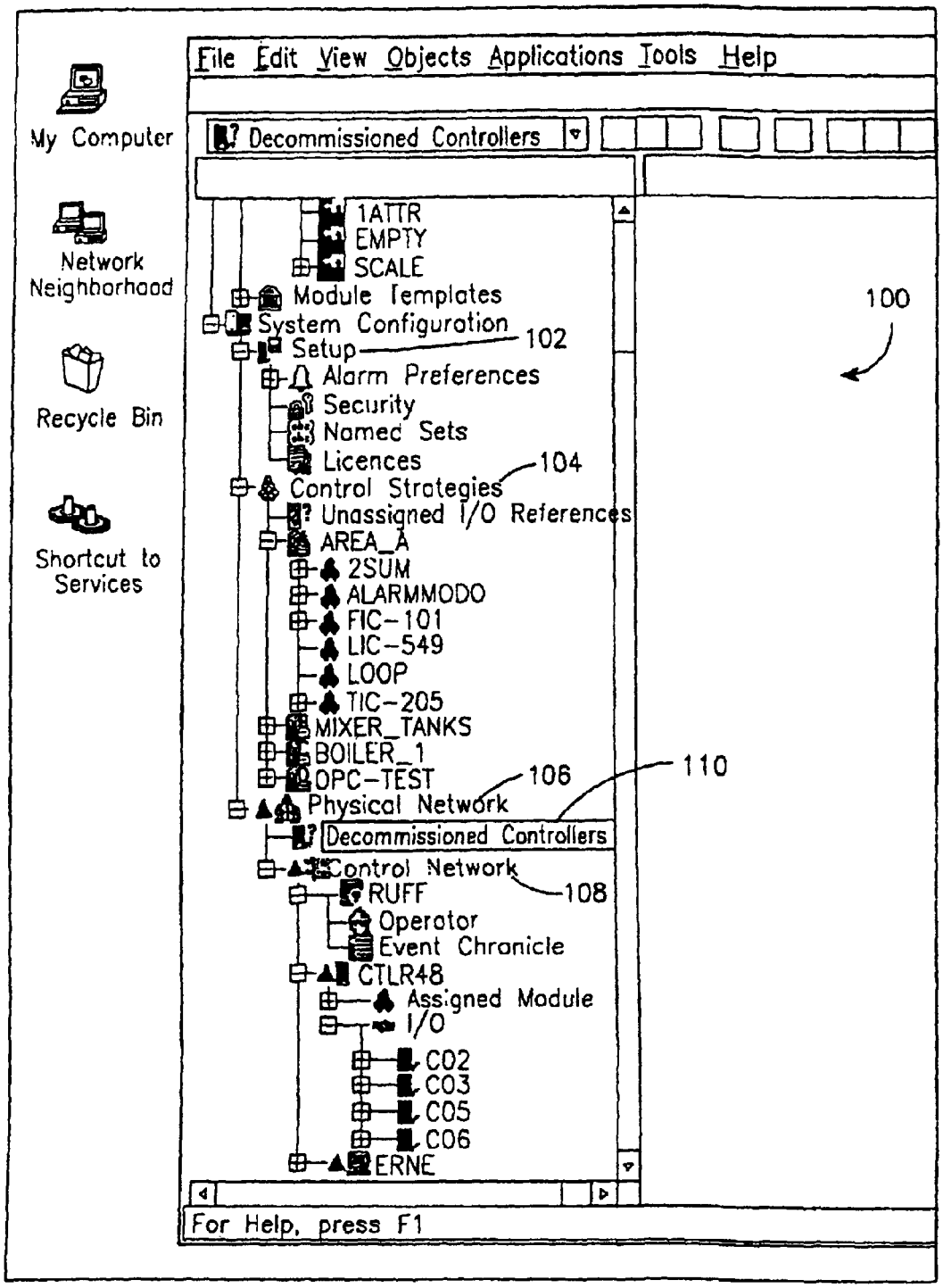
FIG. 1 is a pictorial view of a front-of-screen display for a graphical user interface (GUI) displaying a system configuration.

Referring to FIG. 1, a front-of-screen display, also called a "screen" 100, for a graphical user interface (GUI) depicts a display of a system configuration. The screen 100 depicts navigation selections which are operated by a user to select, construct and operate a process control configuration. The navigation program supplies an initial state for navigating across various tools and processors in a network. A user controls the navigation program to access libraries, areas, process control equipment and security operations.

The illustrative system configuration is described and controlled with respect to a control system setup 102, control strategies 104, and a physical setup 106. The functions of automatically sensing and automatically configuring a control system relate to the physical setup 106. In particular, the functions of automatically sensing and automatically configuring physical devices in a control system relate to the commission and activation of devices in the control network 108, and the decommissioning of controllers 110.

In an illustrative embodiment, a process control system controls various devices attached to a process control network in accordance with a Fieldbus standard protocol. In the Fieldbus protocol, a standard user application is defined based on blocks. A block is a representation of various different types of application functions. Types of blocks include resource blocks, function blocks, and transducer blocks.

A resource block describes characteristics of a fieldbus device such as a device name, manufacturer, and serial number. A device includes only a single resource block.

A function block defines the control system behavior. Input and output parameters of function blocks may be linked over the fieldbus. The execution of each function block is precisely scheduled. A user application may include numerous function blocks. Examples of standard function blocks include analog input (AI), analog output (AO), bias (B), Control Selector (CS), Discrete Input (DI), Discrete Output (DO), Manual Loader (ML), Proportional/Derivative (PD), Proportional/Integral/Derivative (PID) and ratio (RA). Function blocks are built into fieldbus devices to define a selected device functionality. In one example, a simple temperature transmitter may contain an Al function block. A control valve often includes a PID function block and an AO block.

A transducer block decouples function blocks from local input and output functions for reading sensors and commanding output hardware. Transducer blocks contain information such as calibration data and sensor type. Typically a user application uses one transducer block for each input or output function block.

Another object defined in the user application includes link objects for defining the links between function block inputs and outputs internal to the device and across the fieldbus network. Trend objects allow local trending of function block parameters for access by other devices. Alert objects are used to allow reporting of alarms and events on the fieldbus. View objects are predefined groupings of block parameter sets that are used in the human/machine interface. The function block specification defines four views for each type of block.

Figure 2:
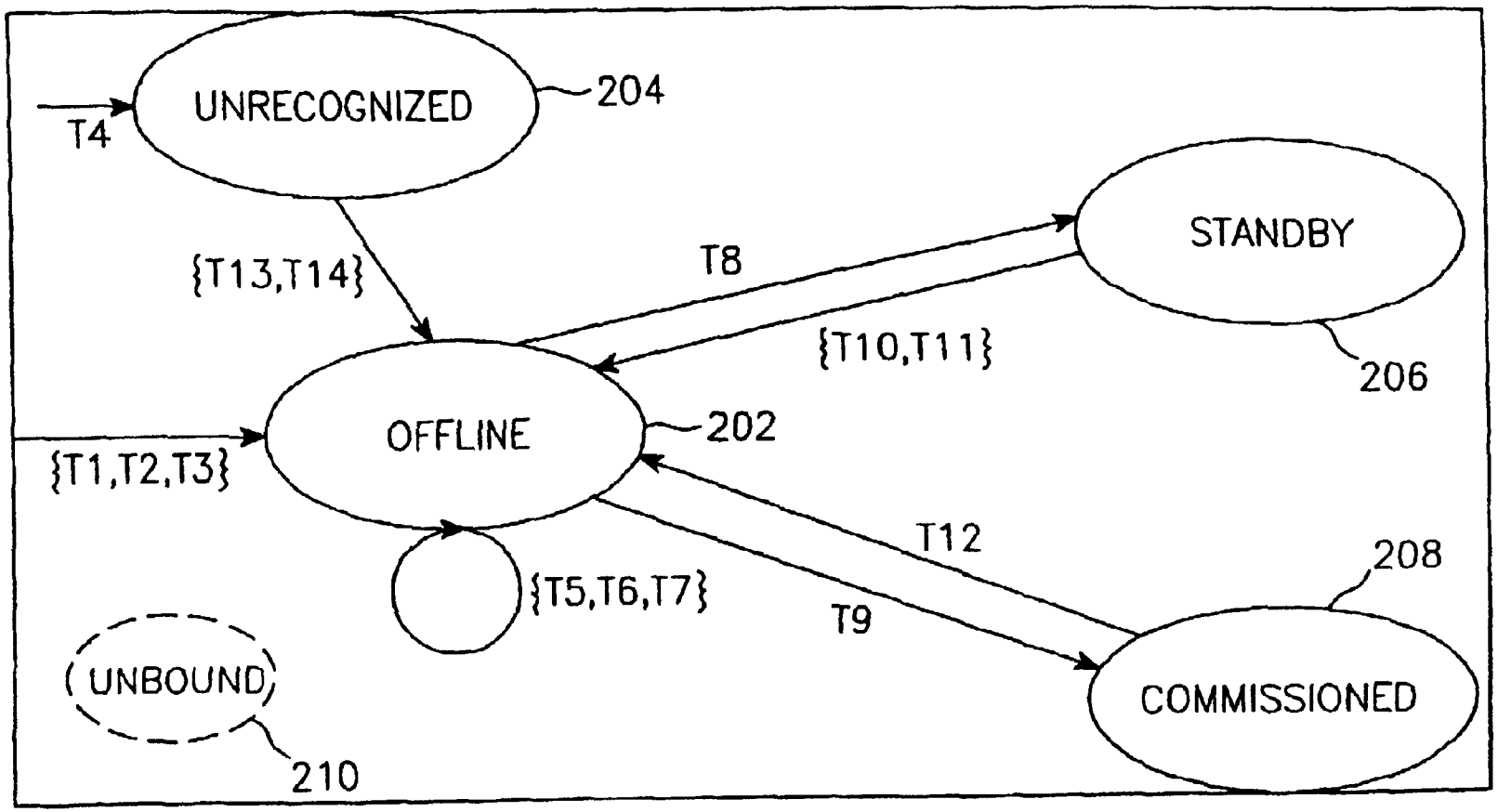
FIG. 2 is a state transition diagram illustrating various states of a field device.

Referring to FIG. 2, a state transition diagram illustrates the various states of a field device. The field device states include an offline state 202, an unrecognized state 204, a standby state 206, a commissioned state 208, and an unbound state 210. The state of a field device is determined by several parameters including a system management state (SM-State), a physical device tag (PD-Tag), a device address, device revision information (Rev*), and a device identification (Device-ID). In the illustrative embodiment, a device in the commissioned state 208 is a Fieldbus device that is available for control strategy configuration and installation. A decommissioned device is a device that has been removed from the commissioned state 208.

Several events occur that generate a state transition of a plurality of state transitions T1 through T14. One or more actions are performed during each state transition.

A state transition T1 is caused by the event in which a field device residing at a temporary address is queried with a system management identify service (SM-IDENTIFY) and the query determines that the device has a cleared physical device tag. The state transition T1 changes from a NULL state to an OFFLINE state by allocating a standby address for the field device. Executing logic, typically in the form of firmware, software, or hardware, executes a set physical device tag service (SET-PD-TAG) to set the physical device tag identical to the device identification of the field device. Executing logic also uses a set device address service (SET-ADDRESS) to send a standby address to the field device.

A state transition T2 is caused by the event in which a field device residing at a temporary address is queried with a system management identify service (SM-IDENTIFY) and the query determines that the device has a physical device tag that is identical to the device identification of the device. The state transition T2 changes from a NULL state to an OFFLINE state by allocating a standby address for the field device. Executing logic uses a set device address service (SET-ADDRESS) to send a standby address to the field device.

A state transition T3 is caused by the event in which a field device residing at a temporary address is queried with a system management identify service (SM-IDENTIFY) and the query determines that the device has a physical device tag and a device identification configured for the current process control system network link. The state transition T3 changes from a NULL state to an OFFLINE state using executing logic that employs the set device address service (SET-ADDRESS) to send an assigned address to the field device.

A state transition T4 is caused by the event in which a field device residing at a temporary address is queried with a system management identify service (SM-IDENTIFY) and the query determines that the device has a physical device tag and a device identification not configured for the current process control system network link. The state transition T4 changes from a NULL state to an UNRECOGNIZED state.

A state transition T5 is caused by an event in which the device appears at a temporary address and the device is being commissioned by a user. The state transition T5 changes from an OFFLINE state to an OFFLINE state using executing logic, typically in the form of firmware, software, or hardware, that executes a set physical device tag service (SET-PD-TAG) to clear the physical device tag of the field device. Executing logic also executes a set physical device tag service (SET-PD-TAG) to send an assigned physical device tag to the field device. Executing logic further uses a set device address service (SET-ADDRESS) to send an assigned address to the field device.

A state transition T6 is caused by an event in which the device appears at a temporary address and the device is being decommissioned by a user. The state transition T6 changes from an OFFLINE state to an OFFLINE state using executing logic that executes a set physical device tag service (SET-PD-TAG) to clear the physical device tag of the field device.

A state transition T7 is caused by an event in which a user requests to place a decommissioned device in standby. The state transition T7 changes from an OFFLINE state to an OFFLINE state by allocating a standby address for the field device. Executing logic executes a set physical device tag service (SET-PD-TAG) to set the physical device tag identical to the device identification of the field device. Executing logic also uses a set device address service (SET-ADDRESS) to send a standby address to the field device.

A state transition T8 is caused by an event in which the field device appears at the standby address. The state transition T8 changes from an OFFLINE state to a STANDBY state through executing logic that reads device revision information from the resource block.

A state transition T9 is caused by an event in which the field device appears at the assigned address. The state transition T9 changes from an OFFLINE state to a COMMISSIONED.

A state transition T10 is caused by a user requesting to commission a device in the STANDBY state. The state transition T10 changes from the STANDBY state to the OFFLINE state through executing logic that uses a clear address service (CLEAR-ADDRESS) to clear the device address.

A state transition T11 is caused by a user requesting to decommission a device in the STANDBY state. The state transition T11 changes from the STANDBY state to the OFFLINE state through executing logic that uses a clear address service (CLEAR-ADDRESS) to clear the device address.

A state transition T12 is caused by a user requesting to decommission a device in the COMMISSIONED state. The state transition T12 changes from the COMMISSIONED state to the OFFLINE state through executing logic that uses a clear address service (CLEAR-ADDRESS) to clear the device address.

A state transition T13 is caused by a user requesting to decommission a device in the INITIALIZED state of the Fieldbus system management states. The state transition T13 changes from the UNRECOGNIZED state to the OFFLINE state through executing logic that executes a set physical device tag service (SET-PD-TAG) to clear the physical device tag of the field device.

A state transition T14 is caused by a user requesting to decommission a device in the SM-OPERATIONAL state of the Fieldbus system management states. The state transition T14 changes from the UNRECOGNIZED state to the OFFLINE state through executing logic that uses a clear address service (CLEAR-ADDRESS) to clear the device address.

In accordance with the Fieldbus standard, to operate properly a Fieldbus device has a unique device address (network address) and a unique physical device tag. Each device connected to the process control system network link has a unique node designator. A data link specification specifies a range of allowable values for node designators including a range for permanent devices, a range for temporary addresses, and a range for visitor devices. The temporary addresses are used by devices that are not presently in the SM-OPERATIONAL state. The Fieldbus interface maintains partitioning of the address space for permanent devices into three sets. One set, called "assigned addresses", includes addresses assigned to devices with a specific physical device tag, regardless of whether the device is present on the bus. The assigned addresses is assigned using a software engineering tool on the basis of information input by a user relating to Link-Active-Scheduler takeover preference. A second set, termed "standby addresses", describes devices in the SM-OPERATIONAL state but have no device addresses assigned. The standby addresses are managed by the Fieldbus interface. The third set of addresses are addresses outside the first and second sets and refer to unused addresses.

The small number of temporary addresses complicates autosensing and online address assignment. Standby addresses are defined and utilized to support functionality of the autosensing and online address assignment operations. The assigned address set and the standby address set are defined to be equal to the number of potential devices connected to the process control system network link. For example, if sixteen devices may be potentially connected to the process control system network, then sixteen assigned addresses are defined and sixteen standby addresses are defined.

The device revision information includes a manufacturer's identification (MANUFAC-ID), a device type (DEV-TYPE), a device revision (DEV-REV), and a device description revision (DD-REV).

In the offline state 202 a field device is recently attached to a process control system network or is in the process of being commissioned or decommissioned. The offline state 202 includes device states having a plurality of parameter combinations. In a first offline state 202, the system management state is UNINITIALIZED and the physical device tag is cleared. In a second offline state 202, the system management state is INITIALIZED and the physical device tag is read from the physical device and displayable on a screen. In either of the offline states 202, the device address is a temporary address, the revision information is not available, and the device identification is read from the device and displayable on the screen.

In the unrecognized state 204, the field device physical device tag and the device identification do not match the values that are commissioned for a device that is connected to the process control system network. The unrecognized state 204 includes device states having a plurality of parameter combinations. In a first unrecognized state 204, the system management state is INITIALIZED with a device address that is a temporary address. In a second unrecognized state 204, the system management state is SM-OPERATIONAL with a device address that is a standby address or an assigned address. In either unrecognized state 204, the physical device tag is read from the device and displayable on the screen, the device revision is not available, and the device identification is read from the device and displayable on the screen.

In the standby state 206, the field device is not yet autosensed and is therefore not available for configuration in the control strategy or included in Link-Active-Scheduler (LAS) schedules of the system management configuration. In the standby state 206, function block execution and link communications are disabled. Note that a Link-Active-Scheduler is a deterministic centralized bus scheduler that includes a list of transmit times for all data buffers in all devices that are to be cyclically transmitted. When a device is due to send a data buffer, the Link-Active-Scheduler issues a compel data (CD) message to the device. Upon receipt of the CD message, the device broadcasts or "publishes" the data in the buffer to all devices on a field device bus and the broadcasting device is defined to be a "publisher". Any device that is configured to receive the data is defined to be a "subscriber". Scheduled data transfers are typically used for the regular, cyclic transfer of control loop data between devices on the fieldbus.

In the standby state 206, the system management state is SM-OPERATIONAL, the physical device tag is equal to the device identification, and the device address is a standby address. The device revision information is read from the field device and displayable. The device identification is read from the device and displayable on the screen.

The unbound state 210 is a configuration placeholder for a field device that is to be physically attached subsequently. The unbound state 210 supports configuration of control strategies utilizing the function blocks in a field device that is not yet connected. In the unbound state 210, the system management state is not yet applicable but the physical device tag is specified by a user and the device address is assigned by the user. The device revision information set according to the most recent commission or configuration. The device identification is cleared.

In the commissioned state 208, the field device is available for control strategy configuration and installation. The system management state is SM-OPERATIONAL, the physical device tag is specified by a user, and the device address is assigned by the user. The device revision information is read from the field device and displayable on the screen. The device identification is read from the field device, stored in a field configuration database, and displayable on a display screen.

Several operations or "use cases" are defined for controlling commissioning and decommissioning of field devices.

Figure 3:
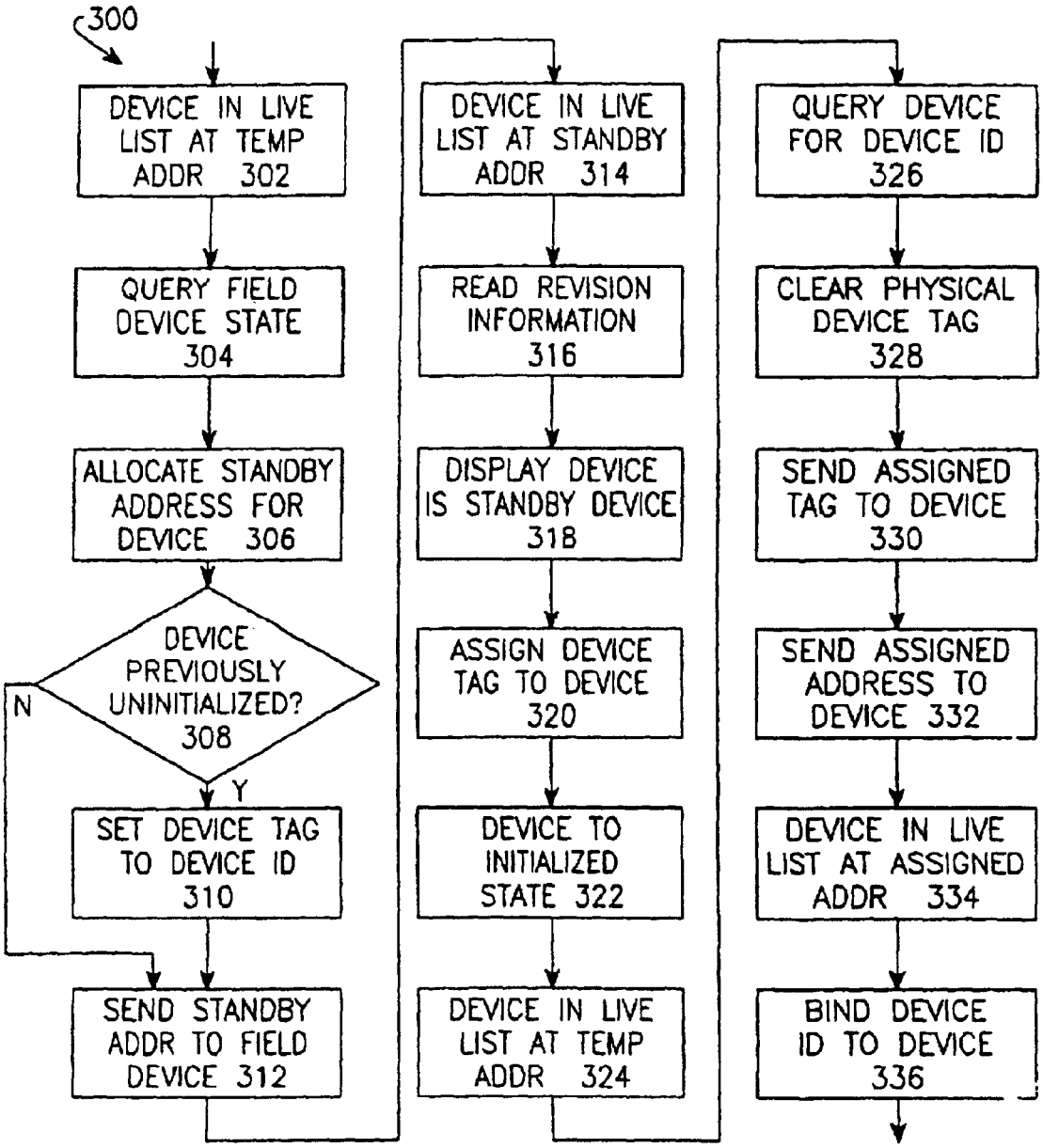
FIG. 3 is a flow chart illustrating a first operation of commissioning a new device.

Referring to FIG. 3, a flow chart illustrates a first operation or "use case" which describes an operation of commissioning a new device 300. Prior to the commissioning of the new device, the Fieldbus interface is operational. A device is connected to the process control system network. The device either has no physical device tag or has a physical device tag that is equal to the device identification.

The operation of commissioning a new device 300 results in a condition in which the device is assigned a new physical device tag and a device address, and the device is ready for function block configuration. The new field device is entered into the process control system network database with the device identification bound and the device revision information set. An engineering software tool that displays the process control system network status displays the new device as a COMMISSIONED device.

In a first step 302, the field device appears in the "live list" at a temporary address. A "live list" is a list of all devices that are properly responding to a pass token (PT) message. All devices on a fieldbus are allowed to send unscheduled messages between the transmission of scheduled messages. The Link-Active-Scheduler grants permission to a device to use the fieldbus by issuing a pass token (PT) message to the device. When the device receives the PT, it is allowed to send messages until the messages are complete or until a maximum allotted token hold time has expired. As a highest priority activity, the Link-Active-Scheduler accesses a CD schedule containing a list of actions that are set to occur on a cyclic basis. At a scheduled time, the Link-Active-Scheduler sends a compel data (CD) message to a specific data buffer in the fieldbus device. The device immediately broadcasts a message to all devices on the fieldbus. The Link-Active-Scheduler performs remaining operations between scheduled transfers. The Link-Active-Scheduler continually adds new devices to the field bus by periodically sending probe node (PN) messages to addresses that are not on the live list. If a device is present at the address and receives the PN, the device immediately returns a probe response (PR) message. If a device responds with the PR message, the Link-Active-Scheduler adds the device to the live list and confirms by sending the device a node activation (NA) message. A device remains on the live list so long as the device responds properly to PTs. When a device is added or removed from the live list, the Link-Active-Scheduler broadcasts changes to the live list to all devices to allow each device to maintain a current copy of the live list.

In a second step 304, the interface queries the field device using a system management identify service (SM-IDENTIFY) and determines whether the field device is in the UNINITIALIZED state with no physical device tag set or in the INITIALIZED state having a physical device tag that is equal to the device identification. The interface then allocates 306 a standby address for the field device.

A logical step 308 directs that a previously UNINITIALIZED device, in step 310, sets the physical device tag of the field device identical to the device identification using a set physical device tag service (SET-PD-TAG), thereby placing the field device in the INITIALIZED state. The standby address is sent to the field device 312 using a set address service (SET-ADDRESS), advancing the field device from the INITIALIZED state to the SM-OPERATIONAL state. At this point the field device appears in the "live list" at a standby address 314. Device revision information is read from the resource block 316. In step 318, an executing software engineering tool displays the field device as a STANDBY device.

In step 320, a new user assigns a new physical device tag to the field device. The physical device tag is constrained to be unique and not the same as the device identification. During the assignment of the physical device tag, a device address is assigned to the field device using a software engineering tool and the Link-Active-Scheduler takeover preference is set to "selectable". The device revision information is read from the field device and written to the process control system network database. The interface changes the state of the field device 322 to the INITIALIZED state using a clear address service (CLEAR-ADDRESS). The field device appears in the "live list" at a temporary address 324.

In a step 326, the interface queries the field device using a system management identify service (SM-IDENTIFY) and recognizes the field device by the device identification. The interface uses the set physical device tag service (SET-PD-TAG) to clear the physical device tag 328, thereby changing the field device state to the UNINITIALIZED state. The set physical device tag service (SET-PD-TAG) is then used to send the assigned physical device tag to the field device 330, changing the field device state to the INITIALIZED state. The set address service (SET-ADDRESS) is called to send the assigned address to the field device 332, placing the field device in the system management operational state (SM-OPERATIONAL). The field device appears in the "live list" at the assigned address 334. In the process control system network database, the device identification is bound 336 to the device. The software engineering tool displays the field device as a COMMISSIONED device.

Figure 4:
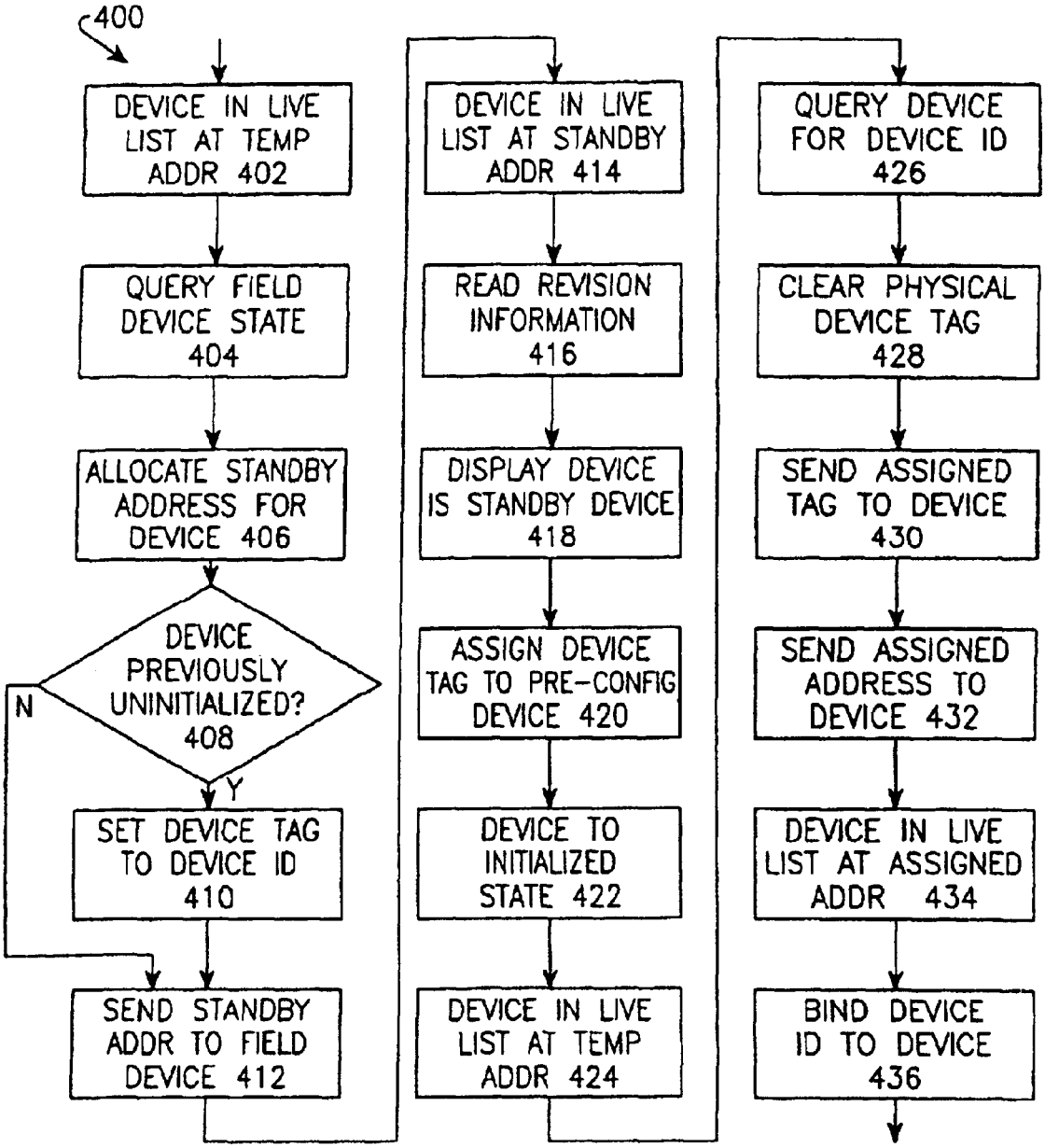
FIG. 4 is a flow chart illustrating a second operation of commissioning an unbound.

Referring to FIG. 4, a flow chart illustrates a second operation or "use case" which describes an operation of commissioning an unbound device 400. Prior to the commissioning of the unbound device, the Fieldbus interface is operational. A field device has been created in the process control system network database and a physical device tag and a device address are assigned to the field device. However, the field device is not bound to a device identification. The process control system network database has also been initialized to contain device revision information read from the field device. A software engineering tool displays the field device as an UNBOUND device. The UNBOUND device to be commissioned is either a field device with no physical device tag or a field device having a physical device tag that is identical to the device identification. The UNBOUND field device is commissioned to place the field device on the process control system network link.

The operation of commissioning an UNBOUND device 400 results in a condition in which the device is configured with a physical device tag and an assigned device address, and the device is ready for function block configuration. The new field device is entered into the process control system network database with the device identification bound. An engineering software tool that displays the process control system network status displays the device as a COMMISSIONED device.

In a first step 402, the field device appears in the "live list" at a temporary address. In a second step 404, the interface queries the field device using a system management identify service (SM-IDENTIFY) and determines whether the field device is in the UNINITIALIZED state with no physical device tag set or in the INITIALIZED state having a physical device tag that is equal to the device identification. The interface then allocates 406 a standby address for the field device.

A logical step 408 directs that a previously UNINITIALIZED device, in step 410, sets the physical device tag of the field device identical to the device identification using a set physical device tag service (SET-PD-TAG), thereby placing the field device in the INITIALIZED state. The standby address is sent to the field device 412 using a set address service (SET-ADDRESS), advancing the field device from the INITIALIZED state to the SM-OPERATIONAL state. At this point the field device appears in the "live list" at a standby address 414. Device revision information is read from the resource block 416. In step 418, an executing software engineering tool displays the field device as a STANDBY device.

In step 420, a user assigns a physical device tag to the field device by associating the field device with the preconfigured device. The device revision information is read from the field device to ascertain that the information matches the device revision information in the process control system network database for the preconfigured device. If the device revision information of the device does not match the database, the user may override the database, reading the device revision information from the field device and writing the information to the process control system network database. Alternatively, the device revision information for an UNBOUND device may be made blank, allowing any physical device to be bound with the UNBOUND device. The interface changes the state of the field device 422 to the INITIALIZED state using a clear address service (CLEAR-ADDRESS). The field device appears in the "live list" at a temporary address 424.

In a step 426, the interface queries the field device using a system management identify service (SM-IDENTIFY) and recognizes the field device by the device identification. The interface uses the set physical device tag service (SET-PD-TAG) to clear the physical device tag 428, thereby changing the field device state to the UNINITIALIZED state. The set physical device tag service (SET-PD-TAG) is then used to send the assigned physical device tag to the field device 430, changing the field device state to the INITIALIZED state. The set address service (SET-ADDRESS) is called to send the assigned address to the field device 432, placing the field device in the system management operational state (SM-OPERATIONAL). The field device appears in the "live list" at the assigned address 434. In the process control system network database, the device identification is bound 436 to the device. The software engineering tool displays the field device as a COMMISSIONED device.

Figure 5:
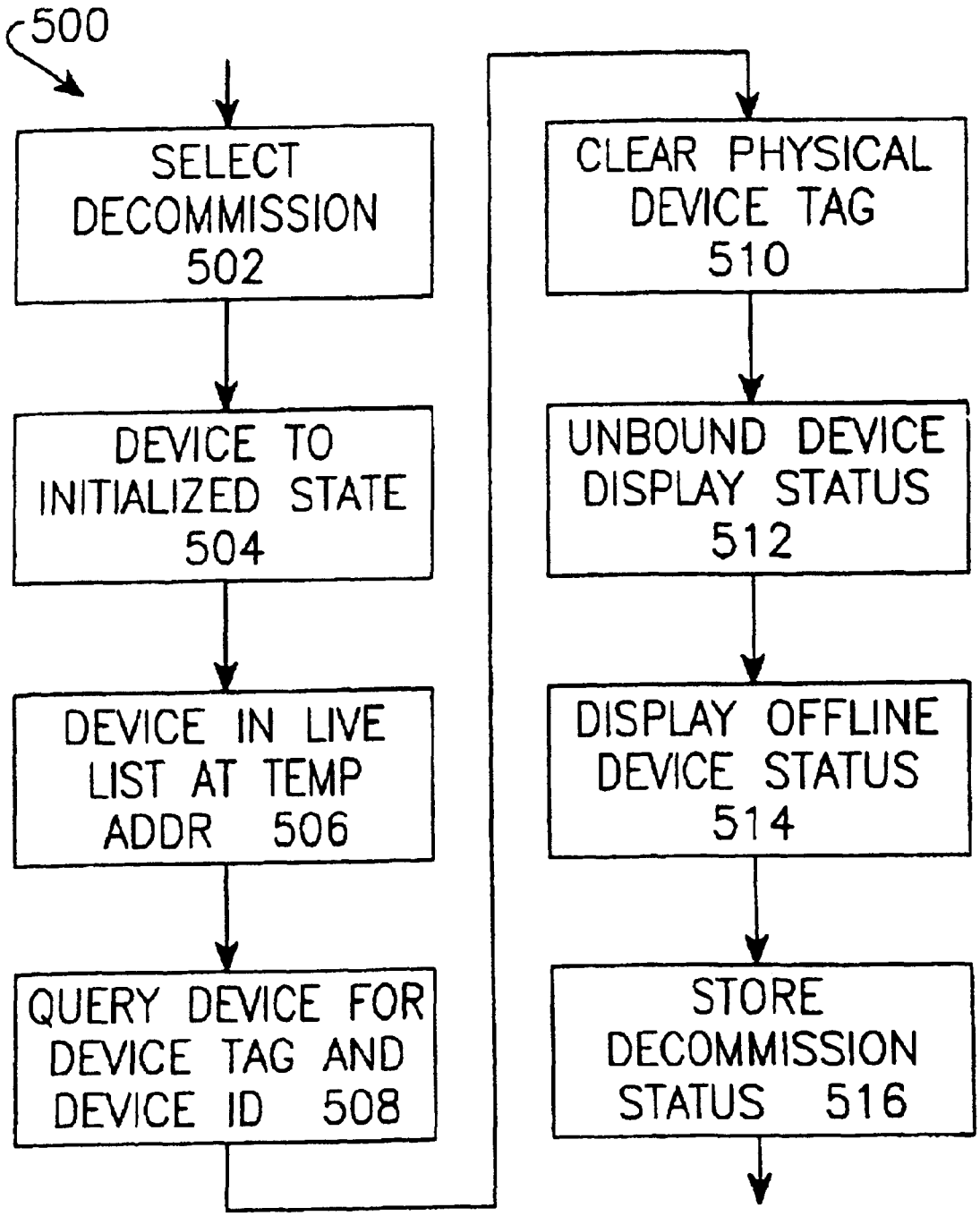
FIG. 5 is a flow chart illustrating a third operation of decommissioning a device.

Referring to FIG. 5, a flow chart illustrates a third operation or "use case" which describes an operation of decommissioning a device 500. A field device is decommissioned for several reasons. For example, when a Fieldbus device is obsolete, a user may wish to clear a network interconnection structure of nonfunctioning branches so that the process control system no longer expends resources on the obsolete device. Also, a user may suspect that a Fieldbus device is malfunctioning and degrading operations of a segment of a network interconnection structure. The user may diagnose the problem by having the process control system ignore the suspected Fieldbus device temporarily to determine whether the remaining devices in the segment operate properly.

Prior to the operation of decommissioning a device, the Fieldbus interface and the field device are operational and the field device appears in the live list at the assigned or standby address. A software engineering tool displays the field device as a COMMISSIONED or STANDBY device. The software engineering tool executes a routine that prepares the field device for decommissioning, for example by clearing function block tags and clearing an OPERATIONAL-POWERUP flag.

The operation of decommissioning a device results in a condition in which the physical device tag of the field device is cleared and the field device is prepared to be removed from the process control system network link. The process control system network database entry for the field device designates the device identification as in an unbound condition. The software engineering tool displays the device identification as an UNBOUND device and displays the physical device as an OFFLINE device.

The operation of decommissioning a device 500 begins when a user selects a "Decommission" operation for the field device 502. A graphic user interface includes a software engineering tool that issues a "Decommission" command to an appropriate controller within the process control system. The decommission command specifies a target I/O subsystem, card and port identifiers, and the device identification of the field device to be decommissioned. The device identification is specified since another device with the same physical device tag may be present in an UNRECOGNIZED state. The interface changes the state of the field device 504 to the INITIALIZED state using a clear address service (CLEAR-ADDRESS). The field device appears in the "live list" at a temporary address 506.

In a step 508, the interface queries the field device using a system management identify service (SM-IDENTIFY) and recognizes the field device by the physical device tag and the device identification. The interface uses the set physical device tag service (SET-PD-TAG) to clear the physical device tag 510, thereby changing the field device state to the UNINITIALIZED state.

In the process control system network database, the device identification is unbound and the software engineering tool displays the field device as an UNBOUND device 512. In a next step 514, the software engineering tool displays the field device as an OFFLINE device.

A network interface card stores a designation that the field device has been decommissioned 516 and does not move the field device to a STANDBY address unless directed by the user. If the decommissioned device is not move to a STANDBY address, the interface card tracks the field device until the field device advances off the live list.

Figure 6:
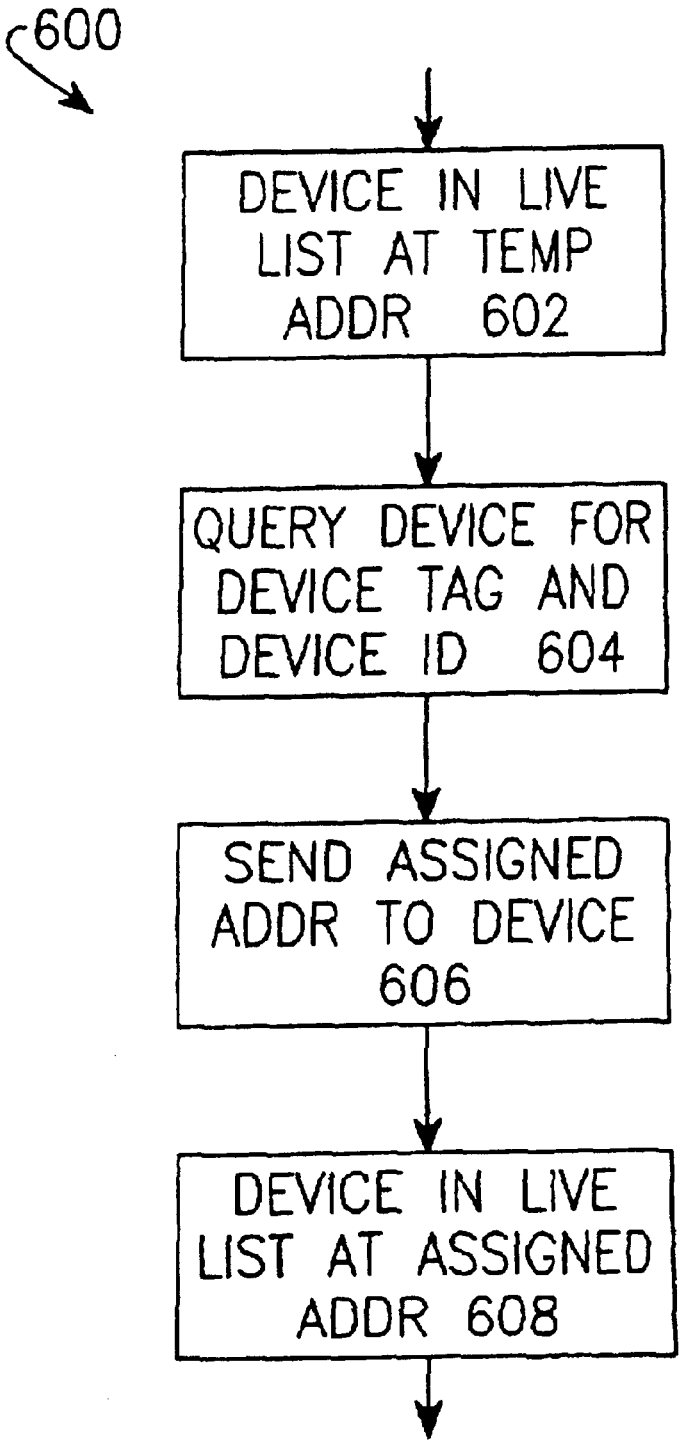
FIG. 6 is a flow chart illustrating a fourth operation of attaching a commissioned device without enablement of operational powerup.

Referring to FIG. 6, a flow chart illustrates a fourth operation or "use case" which describes an operation of attaching a commissioned device without enablement of operational powerup 600. Prior to the operation of attaching a commissioned device 600, the Fieldbus interface is operational. The configuration of the Fieldbus interface includes the field device in an attached condition. The physical device tag and the device identification of the field device are matched. Following the operation of attaching a commissioned device 600, the field device has an assigned address.

The field device appears in the "live list" at a temporary address 602. In a step 604, the interface queries the field device using a system management identify service (SM-IDENTIFY) and recognizes the field device by the physical device tag and the device identification as part of the Fieldbus interface configuration. The set address service (SET-ADDRESS) is called to send the assigned address to the field device 606, placing the field device in the system management operational state (SM-OPERATIONAL). The field device appears in the "live list" at the assigned address 608.

Figure 7:
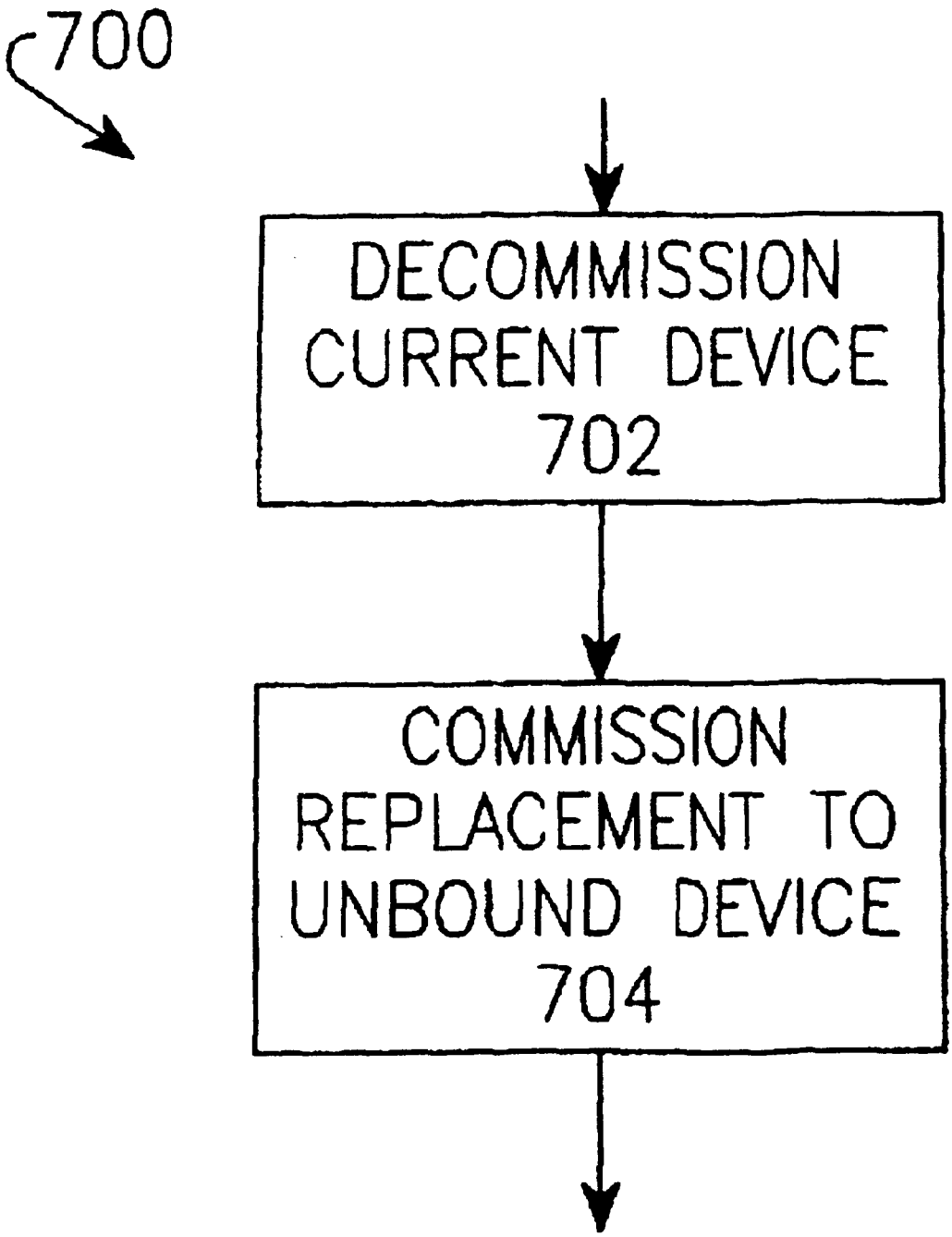
FIG. 7 is a flow chart illustrating a fifth operation of replacing a device.

Referring to FIG. 7, a flow chart illustrates a fifth operation or "use case" which describes an operation of replacing a device 700. A device is replaced by decommissioning the current field device 702 connected to the process control system network link, if possible, and commissioning a replacement to the UNBOUND device 704. The step of decommissioning the current field device 702 is described in detail with reference to FIG. 5. The step of commissioning a replacement to the UNBOUND device 704 is described with reference to FIG. 4.

Figure 8:
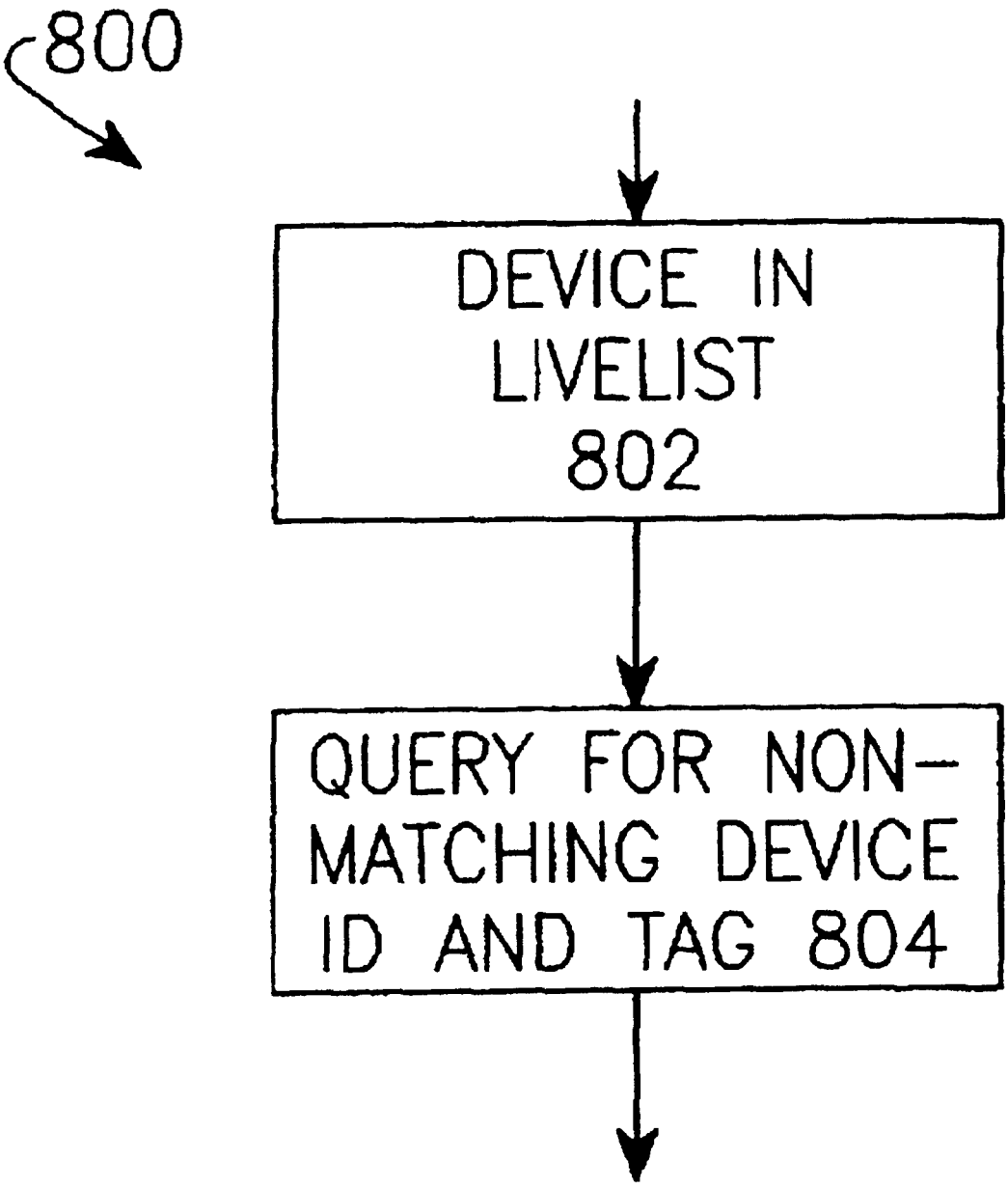
FIG. 8 is a flow chart illustrating a sixth operation of attaching an UNRECOGNIZED device.

Referring to FIG. 8, a flow chart illustrates a sixth operation or "use case" which describes an operation of attaching an UNRECOGNIZED device 800. Prior to the operation of attaching a commissioned device 600, the Fieldbus interface is operational. A field device is attached which has a physical device tag and a device identification that is not configured for the current process control system network link. Following the operation of attaching an UNRECOGNIZED device 800, the field device is identified and the software engineering tool displays the device as n UNRECOGNIZED device. The operation of attaching an UNRECOGNIZED device 800 may be performed without use of the software engineering tool.

The field device appears in the "live list" 802. In a step 804, the interface queries the field device using a system management identify service (SM-IDENTIFY) and determines that the physical device tag and the device identification do not match a field device in the present configuration.

Figure 9:
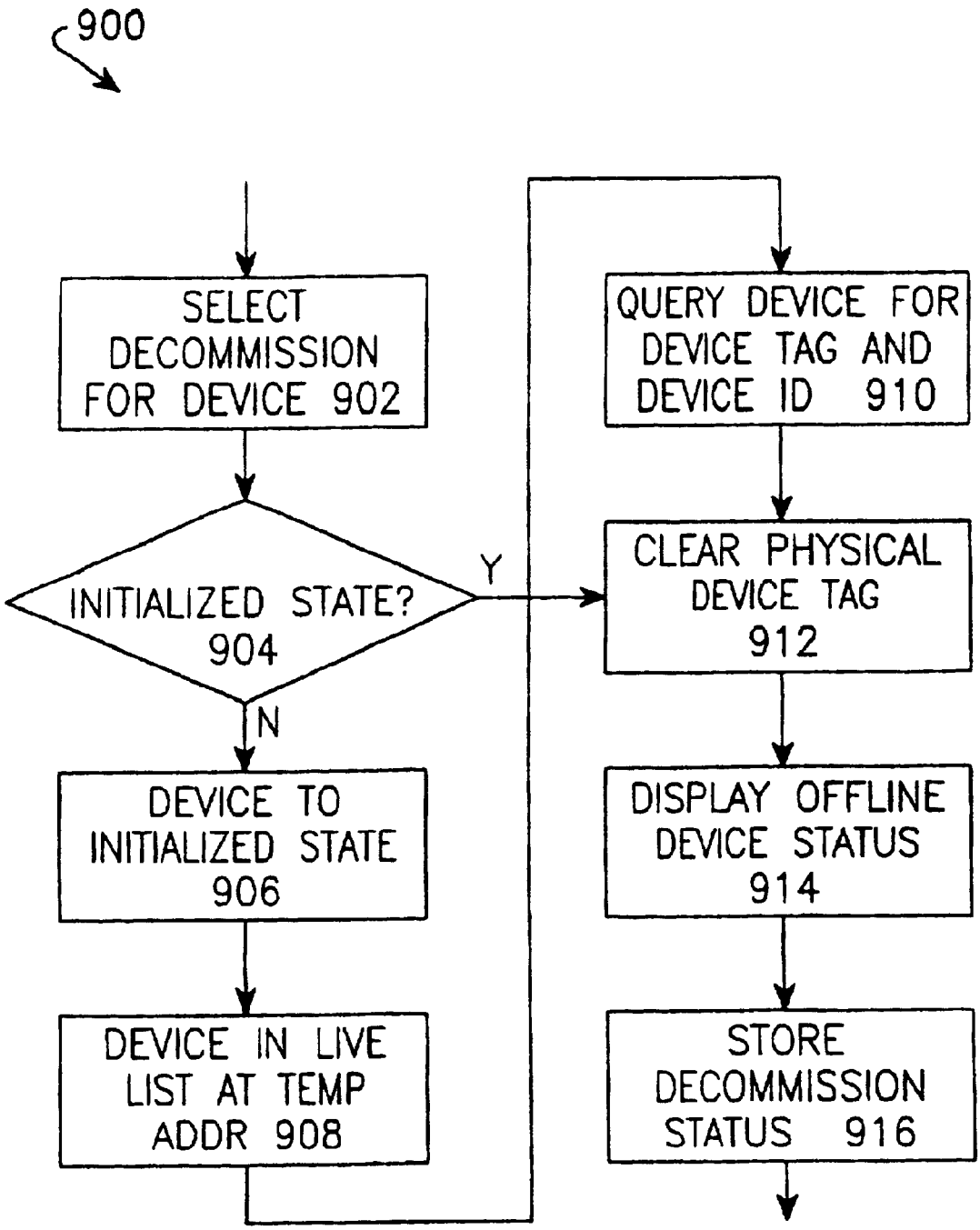
FIG. 9 is a flow chart illustrating a seventh operation of decommissioning an unrecognized device.

Referring to FIG. 9, a flow chart illustrates a seventh operation or "use case" which describes an operation of decommissioning an unrecognized device 900. Prior to the operation of decommissioning an unrecognized device, the Fieldbus interface is operational. The field device is identified which has a physical device tag and a device identification that are not configured for the present process control system network link. A software engineering tool displays the field device as an UNRECOGNIZED device.

The operation of decommissioning an unrecognized device 900 results in a condition in which the physical device tag of the field device is cleared and the field device is prepared to be removed from the process control system network link. The software engineering tool displays the field device as an OFFLINE device.

The operation of decommissioning an unrecognized device 900 begins when a user selects a "Decommission" operation for the field device 902. A graphic user interface includes a software engineering tool that issues a "Decommission" command to an appropriate controller within the process control system. The decommission command specifies a target I/O subsystem, card and port identifiers, and the device identification of the field device to be decommissioned.

If the field device is in the INITIALIZED state, logic step 904 directs the decommissioning operation 900 to a clear the physical device tag step 912. Otherwise, the interface changes the state of the field device 906 to the INITIALIZED state using a clear address service (CLEAR-ADDRESS). The field device appears in the "live list" at a temporary address 908.

In a step 910, the interface queries the field device using a system management identify service (SM-IDENTIFY) and recognizes the field device by the physical device tag and the device identification. The interface uses the set physical device tag service (SET-PD-TAG) to clear the physical device tag 912, thereby changing the field device state to the UNINITIALIZED state. In a next step 914, the software engineering tool displays the field device as an OFFLINE device.

A network interface card stores a designation that the field device has been decommissioned 916 and does not move the field device to a STANDBY address unless directed by the user. If the decommissioned device is not move to a STANDBY address, the interface card tracks the field device until the field device advances off the live list.

Figure 10:
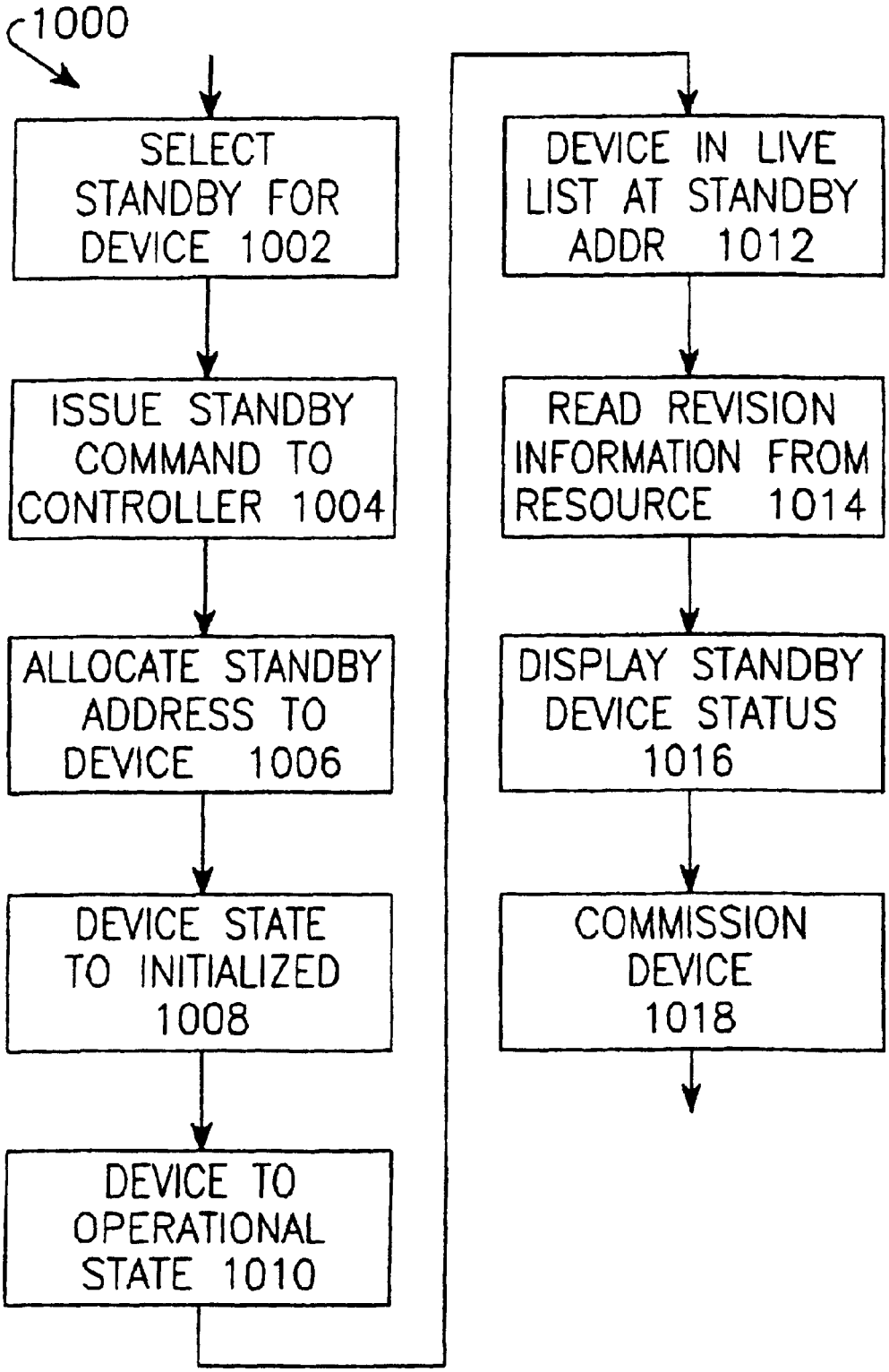
FIG. 10 is a flow chart illustrating an eighth operation of placing a decommissioned device in a standby condition.

Referring to FIG. 10, a flow chart illustrates an eighth operation or "use case" which describes an operation of placing a decommissioned device in a standby condition 1000. Prior to the operation of placing a decommissioned device in a standby condition 1000, the Fieldbus interface is operational. A field device is decommissioned and in the OFFLINE state.

The operation of placing a decommissioned device in standby 1000 results in a condition in which the field device is placed at a standby address with the physical device tag of the field device set identical to the device identification. The software engineering tool displays the field device as a STANDBY device.

The operation of placing a decommissioned device in standby 1000 begins when a user selects a "Place in Standby" operation for the field device 1002. A graphic user interface includes a software engineering tool that issues a "Place in Standby" command to an appropriate controller within the process control system 1004. The decommission command specifies a target I/O subsystem, card and port identifiers, and the device identification of the field device to be placed in standby.

The interface allocates a standby address 1006 for the field device. The set physical device tag service (SET-PD-TAG) is then used to set the physical device tag identical to the device identification 1008, changing the field device state to the INITIALIZED state. The set address service (SET-ADDRESS) is called to send the standby address to the field device 1010, placing the field device in the system management operational state (SM-OPERATIONAL). The field device appears in the "live list" at the standby address 1012. Device revision information is read from the resource block 1014. In step 1016, an executing software engineering tool displays the field device as a STANDBY device.

A user may subsequently commission the field device 1018, either by creating a new device or binding the field device to an UNBOUND device in the process control system network database. The techniques for commissioning a device are described with respect to FIGS. 3 and 4.

Figure 11A:
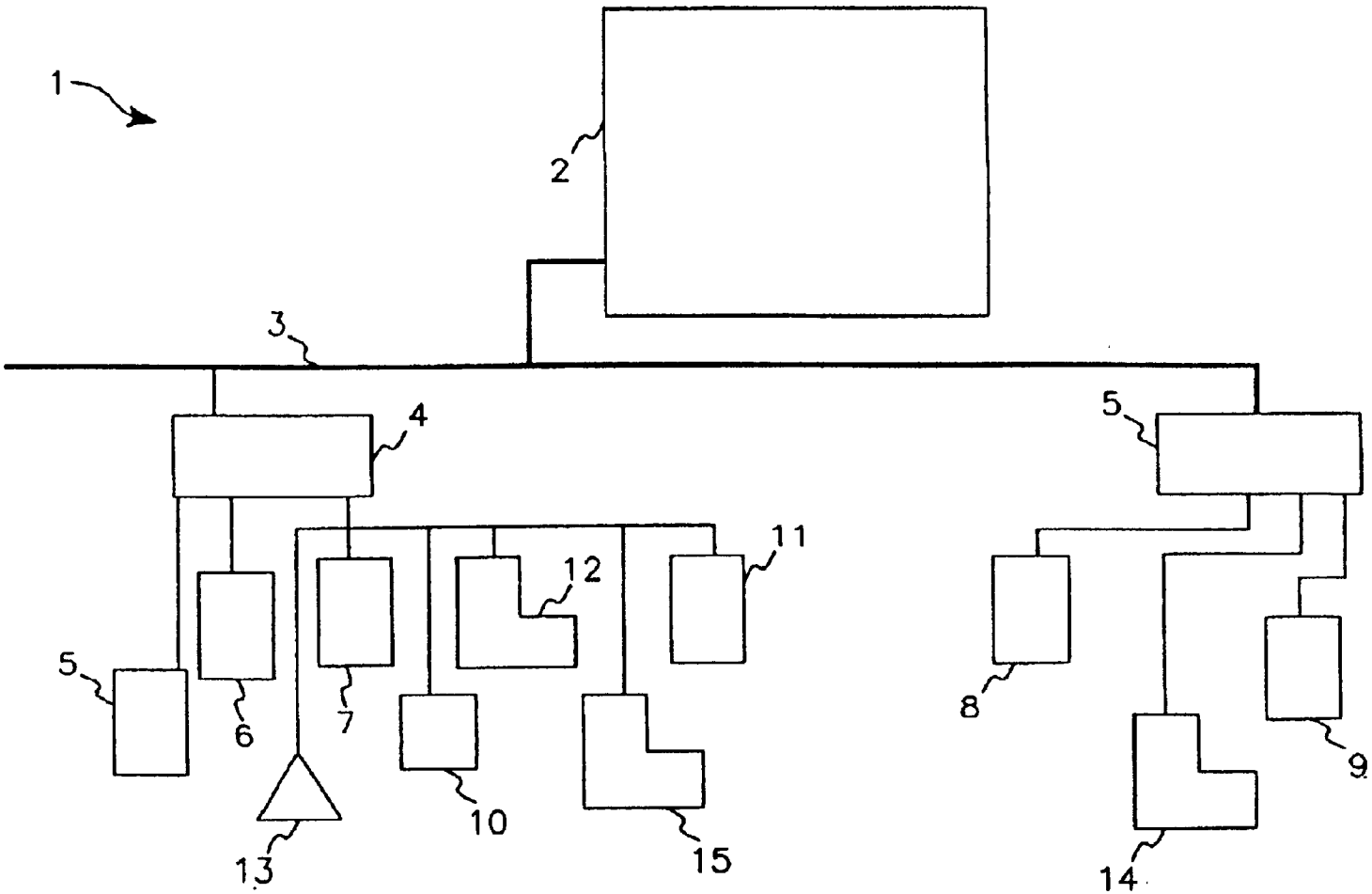
FIGS. 11A, 11B and 11C illustrate a screen display, a first schematic block diagram and a second schematic block diagram respectively, process control systems in accordance with a generalized embodiment of the present invention which furnishes a capability to create a new control template and a capability to modify an existing control template for only one view, such as an engineering view.

Referring to FIG. 11A, a control system is shown. In general, the system 1 includes a main processing device, such as personal computer 2, that is connected to a local area network ("LAN") 3 via a local area network card. Although any local area network protocol may be used, a non-proprietary ethernet protocol is beneficial in many applications because it allows for communications with the local area network 3. The local area network 3 is dedicated to carrying control parameters, control data and other relevant information concerned in the process control system. As such, the LAN 3 may be referred to as an area controlled network or ACN 3. The ACN 3 may be connected to other LANs for sharing information and data via a hub or gateway without affecting the dedicated nature of ACN 3.

In accordance with standard ethernet protocol, a plurality of physical devices may be connected to the ACN 3 at various "nodes." Each physical device connected to the ACN 3 is connected at a node and each node is separately addressable according the LAN protocol used to implement ACN 3.

To establish a redundant system, it may be desirable to construct ACN 3 from two or more ethernet systems such that the failure of a single ethernet or LAN system will not result in the failure of the entire system. When such "redundant ethernets" are used the failure of one ethernet LAN can be detected and an alternate ethernet LAN can be mapped in to provide for the desired functionality of ACN 3.

The main personal computer ("PC") A forms a node on the ACN 3. The PC 2 may, for example, be a standard personal computer running a standard operating system such as Microsoft's Window NT system. Main PC 2 is configured to generate, in response to user input commands, various control routines that are provided via the ACN 3 to one or more local controllers identified as element 4 and 5 which implement the control strategy defined by the control routines selected and established in main PC 2. Main PC 2 may also be configured to implement direct control routines on field devices such as pumps, valves, motors and the like via transmission across the ACN 3, rather than through a local controller 4 or 5.

Local controllers 4 and 5 receive control routines and other configuration data through the ACN 3 from PC 2. The local controllers then generate signals of various types to various field devices (such as pumps, motors, regulator valves, etc.) 6 through 15 which actually implement and perform physical steps in the field to implement the control system established by the routines provided by PC 2.

Two types of field devices may be connected to local controller 4 and 5 including field devices 6 through 10 which are responsive to specific control protocol such as FieldBus, Profibus and the like. As those in the art will appreciate, there are standard control protocols (e.g. FieldBus) according to which specific protocol instructions are provided to a protocol-friendly field devices (e.g., a Fieldbus field devices) will cause a controller located within the field device to implement a specific function corresponding to the protocol function. Accordingly, field devices 6 through 11 receive protocol specific (e.g., FieldBus) control commands from either the local controllers 4 and 5 or the personal computer 2 to implement a field device-specific function.

Also connected to local controllers 4 and 5 are non-protocol field devices 12 through 15, which are referred to as non-protocol because they do not include any local processing power and can respond to direct control signals. Accordingly, field devices 12 through 15 are not capable of implementing functions that would be defined by specific control protocol such as the FieldBus control protocol.

Functionality is supplied to allow the non-protocol field devices 12 through 15 to operate as protocol-friendly (e.g., FieldBus specific) devices 6 through 11. Additionally, this same functionality allows for the implementation of the protocol-specific control routines to be distributed between the local field devices 6 through 11, the local controllers 4 and 5 and the personal computer 2.

Figure 11B:
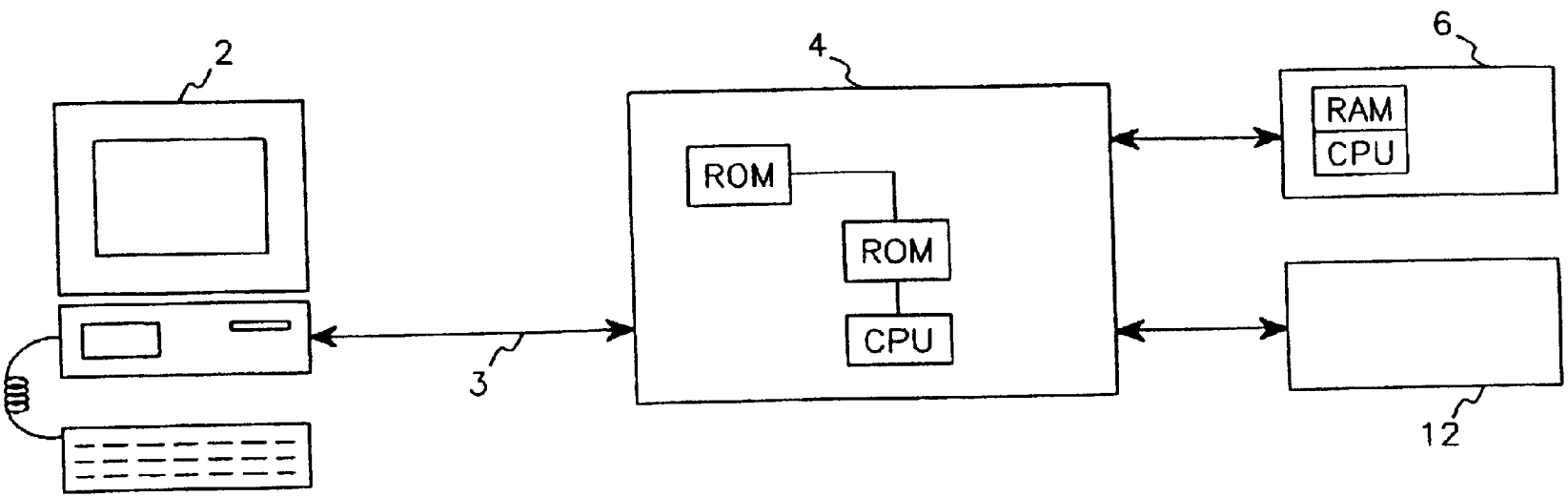

The distribution of protocol-specific control routines is illustrated in more detail in FIG. 11B. FIG. 11B refers to one portion of the system shown in FIG. 11A, specifically the personal computer 2, the ethernet 3, local controller 4, a smart field device 6 and a dumb device 12, in greater detail.

Personal computer 2 includes program software routines for implementing standard functional routines of a standard control protocol such as the FieldBus protocol. Accordingly, personal computer 2 is programmed to receive FieldBus commands and to implement all of the functional routines for which a local field device having Fieldbus capabilities could implement. The ability and steps required to program personal computer 2 to implement FieldBus block functionality will be clearly apparent to one of ordinary skill in the art.

Connected to personal computer 2 by the ethernet 3 is local controller 4. Local controller 4 includes a central processing unit connected to a random access memory which provides control signals to configure the central processing unit to implement appropriate operational functions. A read only memory is connected to the random access memory. The read only memory is programmed to include control routines which can configure the central processing unit to implement all of the functional routines of a standard control protocol such as FieldBus. Personal computer 2 sends signals through ethernet 3 to the local controller 4 which causes one, more or all of the programmer routines in the read only memory to be transferred to the random access memory to configure the CPU to implement one, more or all of the standard control protocol routines such as the FieldBus routines.

The smart field device 6 includes a central processing unit which implements certain control functions. If the devices is, for example, a FieldBus device then the central processing unit associated with the smart field device 6 is capable of implementing all of the FieldBus functionality requirements.

Because the local controller 4 has the ability to implement FieldBus specific controls, controller 4 operates so that non-protocol device 12 acts and is operated as a FieldBus device. For example, if a control routine is running either in personal computer 2 or on the CPU of local controller 4, that control routine can implement and provide FieldBus commands to FieldBus device 6 and non-protocol device 12, operating as a FieldBus device. Since field device 6 is a FieldBus device, device 6 receives these commands and thereby implements the control functionality dictated by those commands. Non-protocol device 12, however, works in conjunction with the central processing unit of local controller 4 to implement the FieldBus requirements such that the local controller in combination with the field device implements and operates FieldBus commands.

In addition to allowing non-FieldBus device 12 to act and operate as a FieldBus device, the described aspect allows for distribution of FieldBus control routines throughout the system 1 shown in FIG. 11A. For example, to the extent that a control routine initially requests field device 6 to implement more than one FieldBus control routine, the system 1 allows for control to be divided between the local controller 4 and the local controller 5 such that a portion of the FieldBus control routines are being implemented by local controller 5 and other FieldBus routines are implemented by the use of the FieldBus routines stored on local controller 4. The division of FieldBus routine implementation may allow for more sophisticated and faster control and more efficient utilization of the overall processing power of the system. Still further, the fact that personal computer 2 has the ability to implement FieldBus control routines, the FieldBus routines are further distributed between the local controller 4 and the personal computer 2. In this manner, the system allows personal computer 2 to implement one or all of the FieldBus routines for a particular control algorithm.

Still further, the system allows for the implementation of FieldBus controls to a non-FieldBus device connected directly to the ethernet 3 through use of the FieldBus control routines stored on personal computer 2 in the same manner that FieldBus routines are implemented on non-FieldBus device 12 through use on the FieldBus routines stored on local controller 4.

Figure 11C:
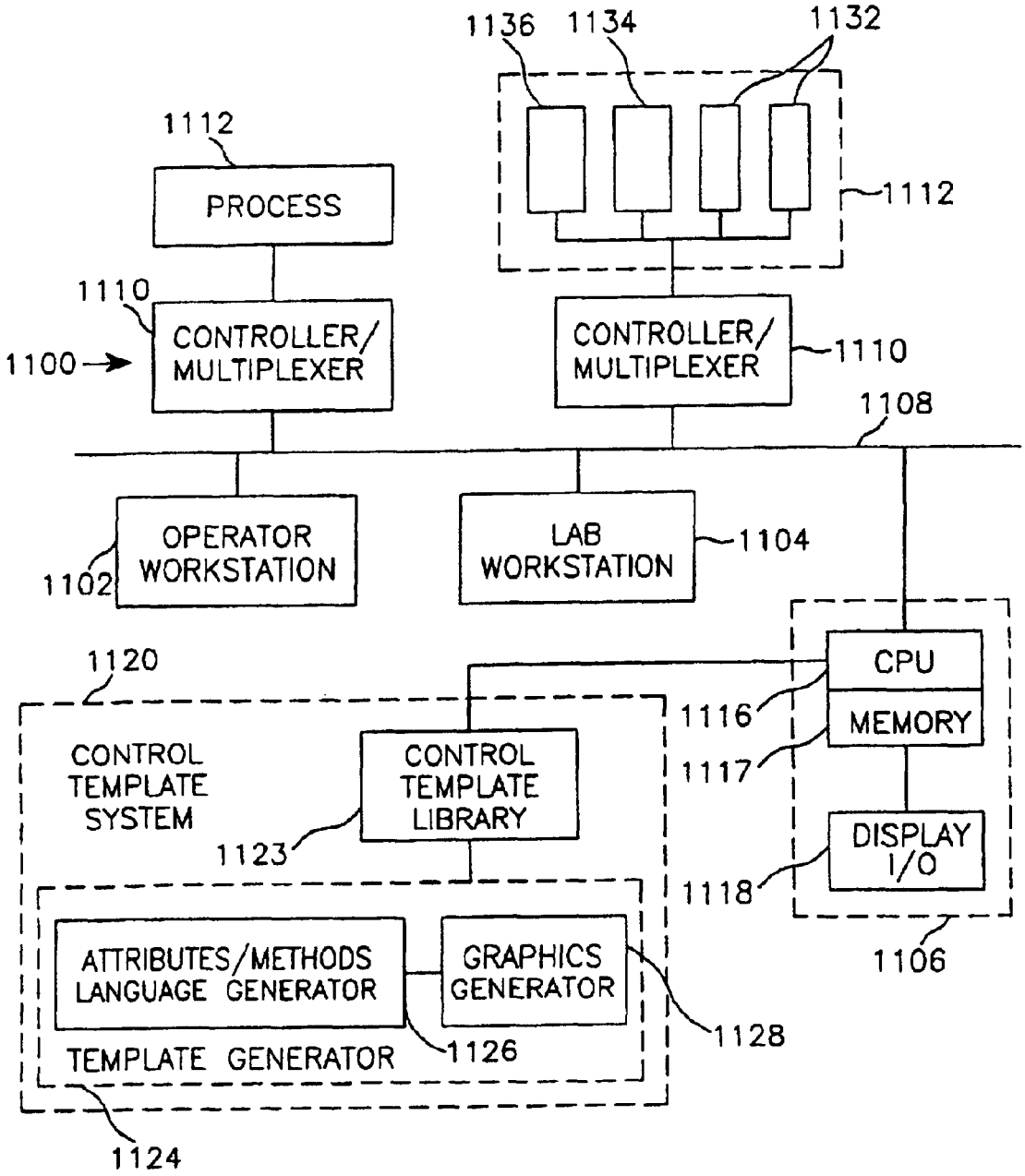

A process control environment 1100 is shown in FIG. 11C and illustrates a control environment for implementing a digital control system, process controller or the like. The process control environment 1100 includes an operator workstation 1102, a laboratory workstation 1104, and an engineering workstation 1106 electrically interconnected by a local area network ("LAN") 1108 for transferring and receiving data and control signals among the various workstations and a plurality of controller/multiplexers 1110. The workstations 1102, 1104, 1106 are shown connected by the LAN 1108 to a plurality of the controller/multiplexers 1110 that electrically interface between the workstations and a plurality of processes 1112. In multiple various embodiments, the LAN 1108 includes a single workstation connected directly to a controller/multiplexer 1110 or alternatively includes a plurality of workstations, for example three workstations 1102, 1104, 1106, and many controller/multiplexers 1110 depending upon the purposes and requirements of the process control environment 1100. In some embodiments, a single process controller/multiplexer 1110 controls several different processes 1112 or alternatively controls a portion of a single process.

In the process control environment 1100, a process control strategy is developed by creating a software control solution on the engineering workstation 1106, for example, and transferring the solution via the LAN 1108 to the operator workstation 1102, lab workstation 1104, and to controller/multiplexer 1110 for execution. The operator workstation 1102 and lab workstation 1104 supply interface displays to the control/monitor strategy implemented in the controller/multiplexer 1110 and communicates to one or more of the controller/multiplexers 1110 to view the processes 1112 and change control attribute values according to the requirements of the designed solution. The processes 1112 are formed from one or more field devices, which may be smart field devices or conventional (non-smart) field devices. The process 1112 is illustratively depicted as two Fieldbus devices 1132, a HART (highway addressable remote transducer) device 1134 and a conventional field device 1136.

In addition, the operator workstation 1102 and lab workstation 1104 communicate visual and audio feedback to the operator regarding the status and conditions of the controlled processes 1112. The engineering workstation 1106 includes a central processing unit (CPU) 1116 and a display and input/output or user-interface device 1118 such as a keyboard, light pen and the like. The CPU 1116 typically includes a dedicated memory 1117. The dedicated memory 1117 includes a digital control system program (not shown) that executes on the CPU 1116 to implement control operations and functions of the process control environment 1100. The operator workstation 1102, the lab workstation 1104 and other workstations (not shown) within the process control environment 1100 include at least one central processing unit (not shown) which is electrically connected to a display (not shown) and a user-interface device (not shown) to allow interaction between a user and the CPU. In one embodiment, the process control environment 1100 includes workstations implemented using a Motorola 68040 processor and a Motorola 68360 communications processor running in companion mode with the 68040 with primary and secondary ethernet ports driven by the 68360 processor (SCC1 and SCC3 respectively).

The process control environment 1100 also includes a template generator 1124 and a control template library 1123 which, in combination, form a control template system 1120. A control template is defined as the grouping of attribute functions that are used to control a process and the methodology used for a particular process control function, the control attributes, variables, inputs, and outputs for the particular function and the graphical views of the function as needed such as an engineer view and an operator view.

The control template system 1120 includes the control template library 1123 that communicates with the template generator 1124. The control template library 1123 contains data representing sets of predefined or existing control template functions for use in process control programs. The control template functions are the templates that generally come with the system from the system designer to the user. The template generator 1124 is an interface that advantageously allows a user to create new control template functions or modify existing control template functions. The created and modified template functions are selectively stored in the control template library 1123.

The template generator 1124 includes an attributes and methods language generator 1126 and a graphics generator 1128. The attributes and methods language generator 1126 supplies display screens that allow the user to define a plurality of attribute functions associated with the creation of a new control template function or modification of a particular existing control template function, such as inputs, outputs, and other attributes, as well as providing display screens for enabling the user to select methods or programs that perform the new or modified function for the particular control template. The graphics generator 1128 furnishes a user capability to design graphical views to be associated with particular control templates. A user utilizes the data stored by the attributes and methods language generator 1126 and the graphics generator 1128 to completely define the attributes, methods, and graphical views for a control template. The data representing the created control template function is generally stored in the control template library 1123 and is subsequently available for selection and usage by an engineer for the design of process control solutions.

The process control environment 1100 is implemented using an object-oriented framework. An object-oriented framework uses object-oriented concepts such as class hierarchies, object states and object behavior. These concepts, which are briefly discussed below, are well known in the art. Additionally, an object-oriented framework may be written using object-oriented programming languages, such as the C++ programming language, which are well-known in the art, or may be written, as is the case with the preferred embodiment, using a non-object programming language such as C and implementing an object-oriented framework in that language.

The building block of an object-oriented framework is an object. The object is defined by a state and a behavior. The state of an object is set forth by fields of the object. The behavior of an object is set forth by methods of the object. Each object is an instance of a class, which provides a template for the object. A class defines zero or more fields and zero or more methods.

Fields are data structures which contain information defining a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection by computer instructions which can be executed in CPU 1116 by computer system software. The instructions of a method are executed, i.e., the method is performed, when software requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data. The methods for a particular object define the behavior of that object.

Classes of an object-oriented framework are organized in a class hierarchy. In a class hierarchy, a class inherits the fields and methods which are defined by the superclasses of that class. Additionally, the fields and methods defined by a class are inherited by any subclasses of the class, i.e., an instance of a subclass includes the fields defined by the superclass and can perform the methods defined by the superclass. Accordingly, when a method of an object is called, the method that is accessed may be defined in the class of which the object is a member or in any one of the superclasses of the class of which the object is a member. When a method of an object is called, process control environment 1100 selects the method to run by examining the class of the object and, if necessary, any superclasses of the object.

A subclass may override or supersede a method definition which is inherited from a superclass to enhance or change the behavior of the subclass. However, a subclass may not supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes defined in the disclosed preferred embodiment, except for mix-in classes which are described below, are subclasses of a class, Object. Thus, each class that is described herein and which is not a mix-in class inherits the methods and fields of class Object.

Figure 12:
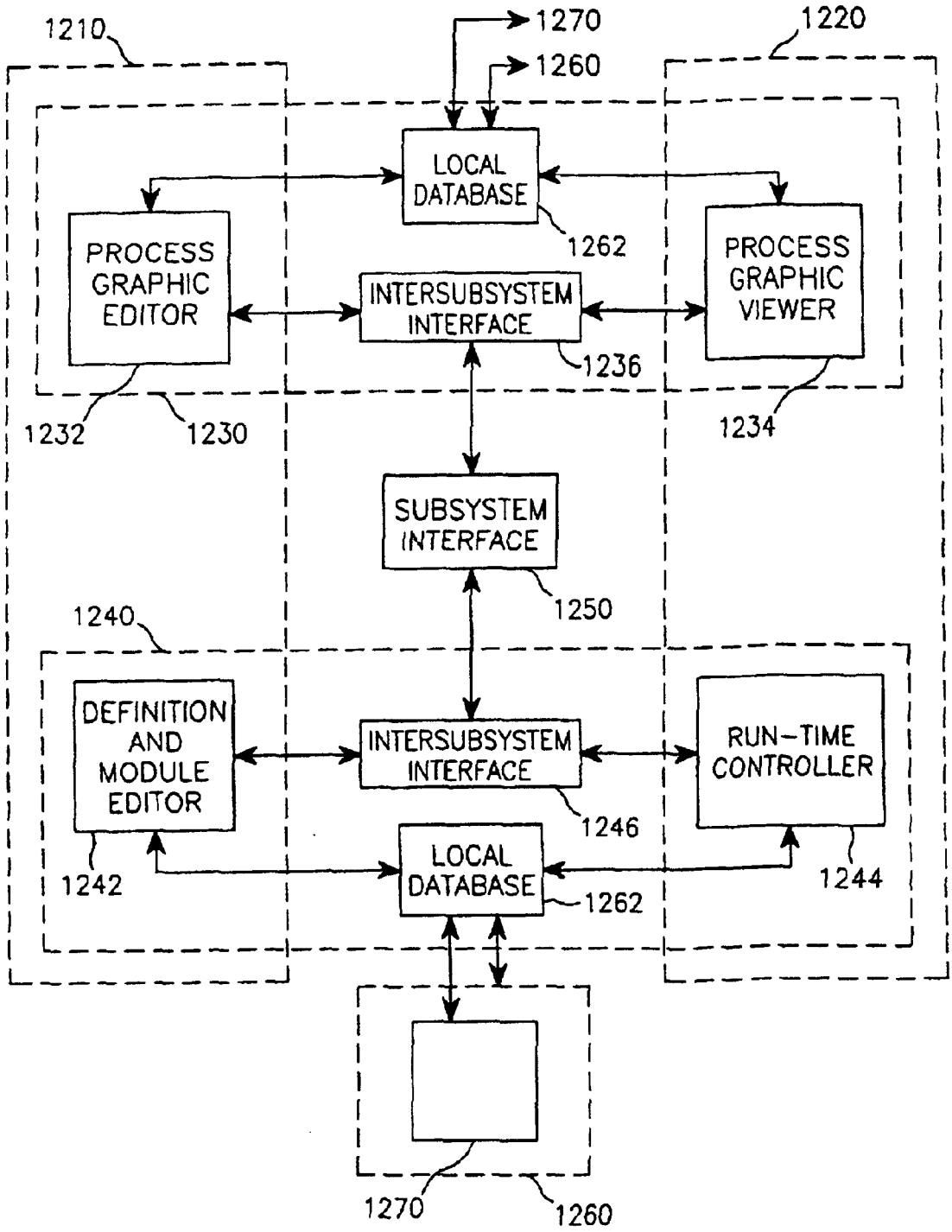
FIG. 12 is a schematic block diagram showing the process control environment in a configuration implementation and a run-time implementation.

The process control environment 1100 exists in a configuration model or configuration implementation 1210 and a run-time model or run-time implementation 1220 shown in FIG. 12. In the configuration implementation 1210, the component devices, objects, interconnections and interrelationships within the process control environment 1100 are defined. In the run-time implementation 1220, operations of the various component devices, objects, interconnections and interrelationships are performed. The configuration implementation 1210 and the run-time implementation 1220 are interconnected by downloading. The download language creates system objects according to definitions supplied by a user and creates instances from the supplied definitions. Specifically, a completely configured Device Table relating to each device is downloaded to all Workstations on startup and when the Device Table is changed. For controller/multiplexers 1110, a downloaded Device Table only includes data for devices for which the controller/multiplexer 1110 is to initiate communications based on remote module data configured and used in the specific controller/multiplexer 1110. The Device Table is downloaded to the controller/multiplexer 1110 when other configuration data is downloaded. In addition to downloading definitions, the download language also uploads instances and instance values. The configuration implementation 1210 is activated to execute in the run-time implementation 1220 using an installation procedure. Also, network communications parameters are downloaded to each device when configuration data are downloaded and when a value is changed.

The process control environment 1100 includes multiple subsystems with several of the subsystems having both a configuration and a run-time implementation. For example, a process graphic subsystem 1230 supplies user-defined views and operator interfacing to the architecture of the process control environment 1100. The process graphic subsystem 1230 has a process graphic editor 1232, a part of the configuration implementation 1210, and a process graphic viewer 1234, a portion of the run-time implementation 1220. The process graphic editor 1232 is connected to the process graphic viewer 1234 by an intersubsystem interface 1236 in the downloaded language. The process control environment 1100 also includes a control subsystem 1240 which configures and installs control modules and equipment modules in a definition and module editor 1242 and which executes the control modules and the equipment modules in a run-time controller 1244. The definition and module editor 1242 operates within the configuration implementation 1210 and the run-time controller 1244 operates within the run-time implementation 1220 to supply continuous and sequencing control functions. The definition and module editor 1242 is connected to the run-time controller 1244 by an intersubsystem interface 1246 in the download language. The multiple subsystems are interconnected by a subsystem interface 1250.

The configuration implementation 1210 and the run-time implementation 1220 interface to a master database 1260 to support access to common data structures. Various local (non-master) databases 1262 interface to the master database 1260, for example, to transfer configuration data from the master database 1260 to the local databases 1262 as directed by a user. Part of the master database 1260 is a persistent database 1270. The persistent database 1270 is an object which transcends time so that the database continues to exist after the creator of the database no longer exists and transcends space so that the database is removable to an address space that is different from the address space at which the database was created. The entire configuration implementation 1210 is stored in the persistent database 1270.

The master database 1260 and local databases 1262 are accessible so that documentation of configurations, statistics and diagnostics are available for documentation purposes.

The run-time implementation 1220 interfaces to the persistent database 1270 and to local databases 1262 to access data structures formed by the configuration implementation 1210. In particular, the run-time implementation 1220 fetches selected equipment modules, displays and the like from the local databases 1262 and the persistent database 1270. The run-time implementation 1220 interfaces to other subsystems to install definitions, thereby installing objects that are used to create instances, when the definitions do not yet exist, instantiating run-time instances, and transferring information from various source to destination objects.

Device Tables are elements of the configuration database that are local to devices and, in combination, define part of the configuration implementation 1210. A Device Table contains information regarding a device in the process control environment 1100. Information items in a Device Table include a device ID, a device name, a device type, a PCN network number, an ACN segment number, a simplex/redundant communication flag, a controller MAC address, a comment field, a primary internet protocol (IP) address, a primary subnet mask, a secondary IP address and a secondary subnet mask.

Figure 13:
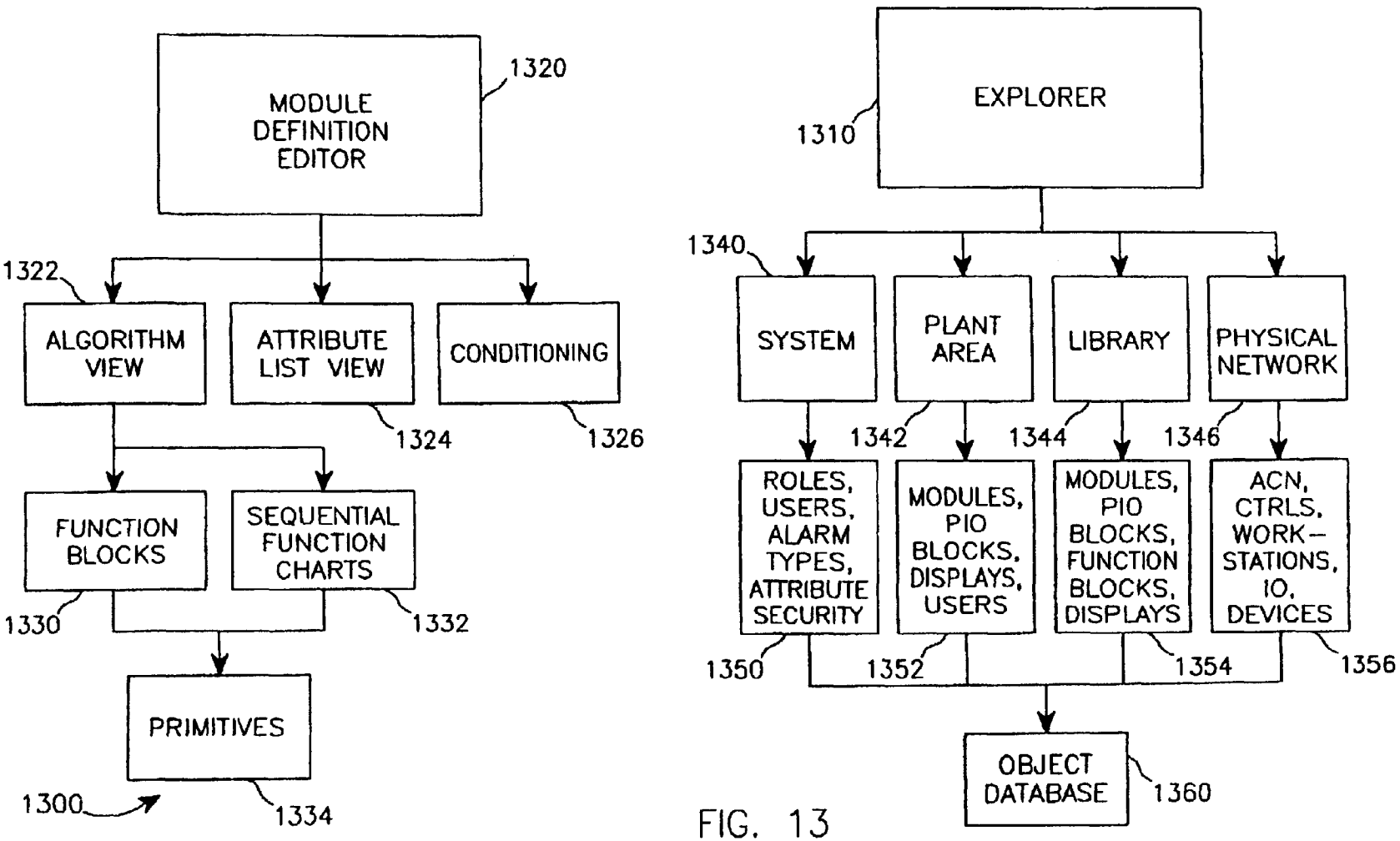
FIG. 13 is a block diagram illustrating a user interface for usage with both configuration and run-time models of the process control environment.

Referring to FIG. 13, a block diagram illustrates a user interface 1300 for usage with both the configuration and run-time models of the process control environment 1100 shown in FIG. 11C. Part of the user interface 1300 is the Explorer™ 1310, an interfacing program defined under the Windows NT™ operating system which features a device-based configuration approach. Another part of the user interface 1300 is a module definition editor 1320 for interfacing to the process control environment 1100 using a control-based configuration approach.

The Explorers 1310 is operated by a user to select, construct and operate a configuration. In addition, the Explorer™ 1310 supplies an initial state for navigating across various tools and processors in a network. A user controls the Explorer™ 1310 to access libraries, areas, process control equipment and security operations. FIG. 13 illustrates the relationship between various tools that may be accessed by a task operating within the process control environment 1100 and the relationship between components of the process control environment 1100 such as libraries, areas, process control equipment and security. For example, when a user selects a "show tags" function from within an area, a "tag list builder" is displayed, showing a list of control and I/O flags. From the tag list builder, the user can use an "add tag" function to add a module to a list, thereby invoking a "module editor".

Figure 14:
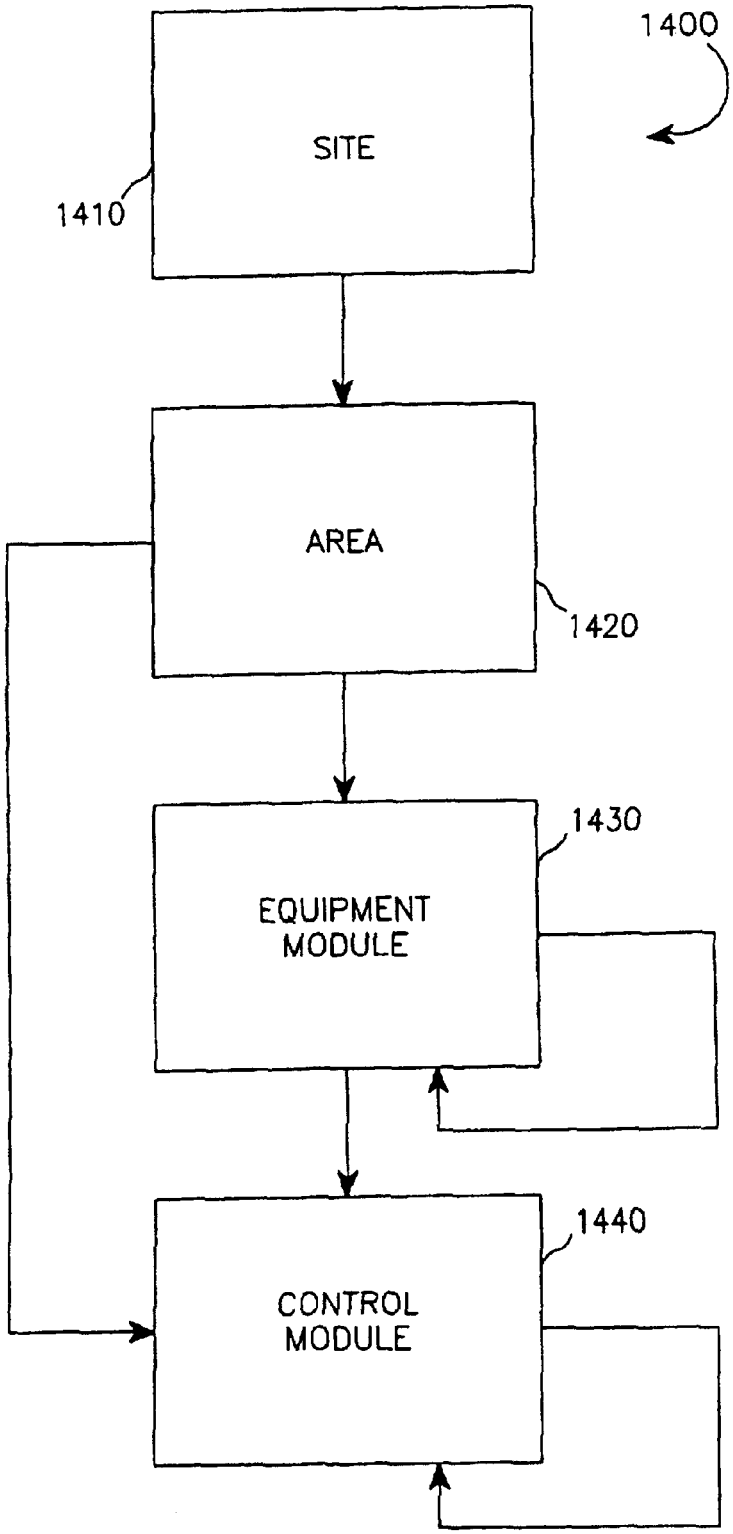
FIG. 14 is a schematic block diagram which depicts a hierarchical relationship among system objects of a configuration model in accordance with an embodiment of the present invention.

Referring to FIG. 14, a schematic block diagram illustrates a hierarchical relationship among system objects of a configuration model 1400. The configuration model 1400 includes many configuration aspects including control, I/O, process graphics, process equipment, alarms, history and events. The configuration model 1400 also includes a device description and network topology layout.

The configuration model hierarchy 1400 is defined for usage by a particular set of users for visualizing system object relationships and locations and for communicating or navigating maintenance information among various system objects. For example, one configuration model hierarchy 1400, specifically a physical plant hierarchy, is defined for usage by maintenance engineers and technicians for visualizing physical plant relationships and locations and for communicating or navigating maintenance information among various instruments and equipment in a physical plant. An embodiment of a configuration model hierarchy 1400 that forms a physical plant hierarchy supports a subset of the SP88 physical equipment standard hierarchy and includes a configuration model site 1410, one or more physical plant areas 1420, equipment modules 1430 and control modules 1440.

The configuration model hierarchy 1400 is defined for a single process site 1410 which is divided into one or more named physical plant areas 1420 that are defined within the configuration model hierarchy 1400. The physical plant areas 1420 optionally contain tagged modules, each of which is uniquely instantiated within the configuration model hierarchy 1400. A physical plant area 1420 optionally contains one or more equipment modules 1430. An equipment module 1430 optionally contains other equipment modules 1430, control modules 1440 and function blocks. An equipment module 1430 includes and is controlled by a control template that is created according to one of a number of different graphical process control programming languages including continuous function block, ladder logic, or sequential function charting ("SFC"). The configuration model hierarchy 1400 optionally contains one or more control modules 1440. A control module 1440 is contained in an object such as a physical plant area 1420, an equipment module 1430 or another control module 1440. A control module 1440 optionally contains objects such as other control modules 1440 or function blocks. The control module 1440 is thus a container class, having instances which are collections of other objects. The control module 444 is encapsulated so that all of the contents and the implementation of the methods of the control module are hidden.

Figure 15:
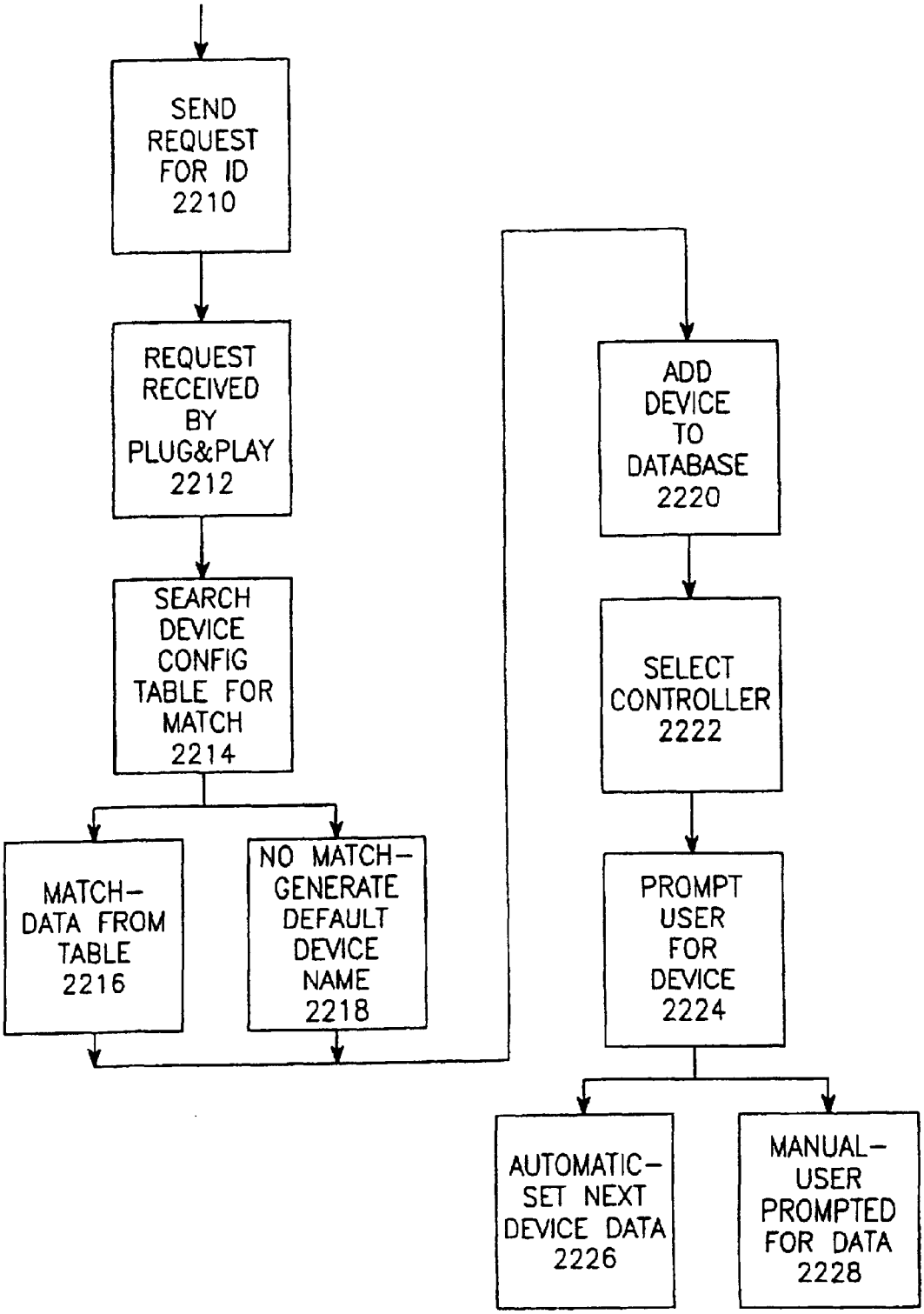
FIG. 15 illustrates a method for automatically sensing and incorporating a controller/multiplexer into a run-time system.

A controller/multiplexer is automatically sensed and incorporated into a run-time system as shown in FIG. 15. In step 2210, a controller/multiplexer, upon connection to the ACN and application of power, automatically sends a request for identification or verify IP address assignment. The request message includes the MAC address of the controller/multiplexer. The request is handled by a "Plug&Play Network Configuration Service", which is known in the operating system art, at a master configuration controller/multiplexer in step 2212. In step 2214, the "Plug&Play Network Configuration Service" receives the request from the network to assign/verify an IP address, searches a table of configured devices for a MAC address match. If a match is found, in step 2216 the "Plug&Play Network Configuration Service" responds with the Device Name, Device ID, IP Address Information, Subnet Mask Information, ACN Segment Number and other items included in the Device Table. If no match is found, in step 2218 the "Plug&Play Network Configuration Service" automatically generates a default name for the device based on the controller/multiplexer MAC address (for example, Controller-000001) The new device is added to the database in a Device Scratch area in step 2220.

In step 2222, using the Explorer™ a user selects each unassigned controller/multiplexer in the Device Scratch area, drags the selection to the appropriate ACN segment and, and either adds the selection to the system as a new device or drops the selection to a pre-existing device configuration. If the unassigned controller/multiplexer is added as a new device, the configuration processing proceeds in the manner of manual incorporation of the device. In step 2224, a user is prompted for the real device name using the previously assigned name 'Controller-000001' as a default. If automatic address assignment is set, the new device is assigned the next Device ID and associated IP addresses and Subnet masks are automatically assigned in step 2226. If manual address assignment is set, the device is automatically assigned the next Device ID and the user is prompted to enter the IP Addresses and Subnet Masks in step 2228. The MAC address for the controller/multiplexer is set to the MAC address of the 'Controller-000001' as dragged into the ACN segment. The new controller/multiplexer Name, Device ID, IP Address, Subnet Masks and ACN number are added to the device table in the database. The next request by an unconfigured controller/multiplexer is answered by the "Plug&Play Network Configuration Service".

If a new controller/multiplexer is dragged and dropped over an existing device, that device must be a controller/multiplexer type device and have an unassigned MAC address. Accordingly, the MAC address of the previously entered controller/multiplexer is set to the MAC address of the 'Controller-000001' device which was dropped. The new controller/multiplexer Name, Device ID, IP Addresses, Subnet Masks and ACN number are available for sending to the requesting controller/multiplexer by the "Plug&Play Network Configuration Service".

The digital control system program 115 includes an auto-configure routine for automatically configuring the input/output (I/O) subsystem in response either to an "auto-configure" command by a user or in response to detection of a new controller/multiplexer.

Figure 16:
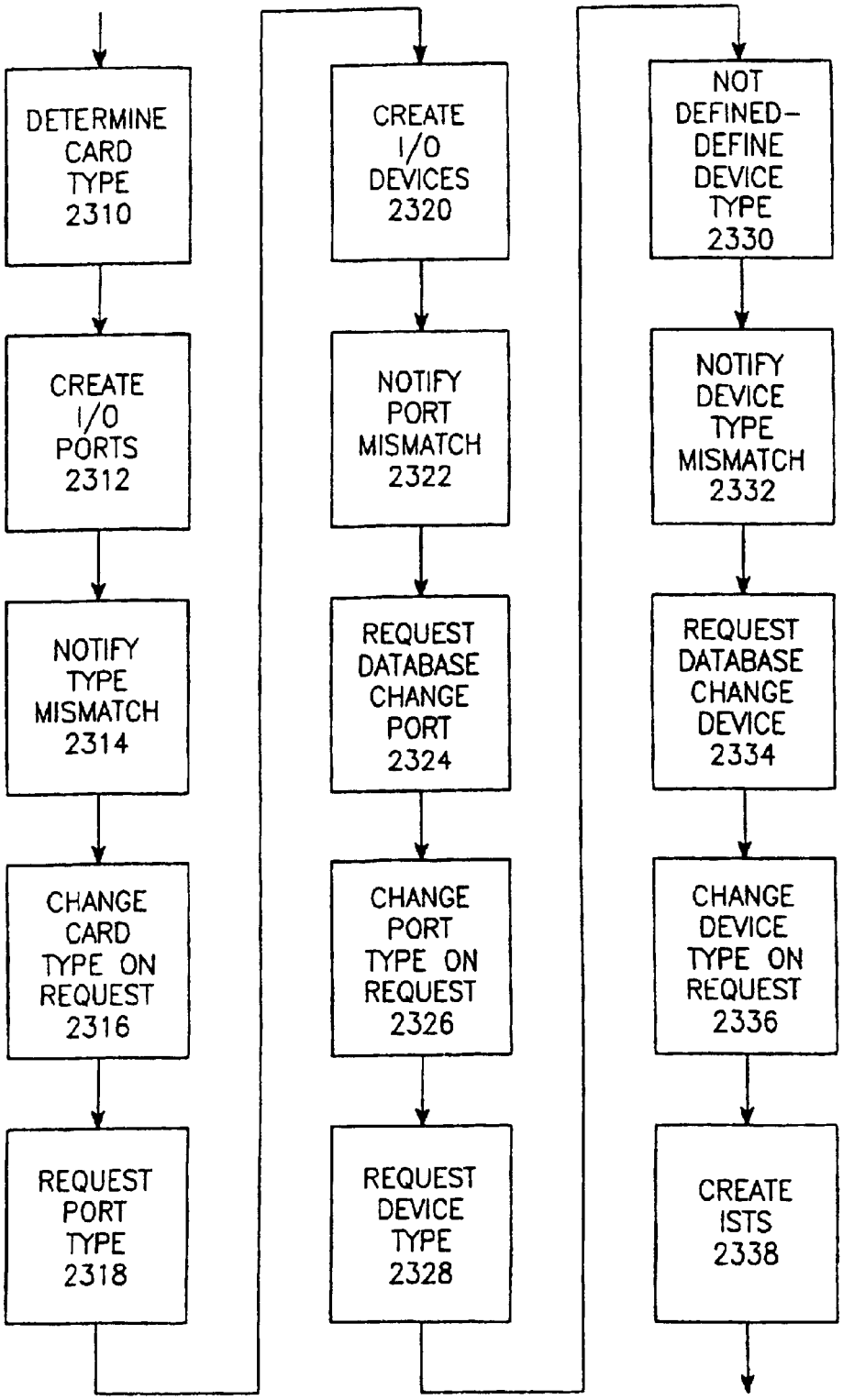
FIG. 16 is a flow chart illustrates steps of an automatic configuration routine for configuring a physical I/O device.

Referring to FIG. 16, a flow chart illustrates steps of an automatic configuration routine for configuring a physical I/O device. An auto-configure command may be directed to a Controller/Multiplexer 1110, causing each I/O subsystem in the Controller/Multiplexer 1110 to auto-configure. An auto-configure command may be directed to an I/O subsystem, causing each I/O Card in the I/O subsystem to auto-configure. An auto-configure command may also be directed to an I/O Card.

The auto-configure operation for an I/O Card first interrogates the I/O Card at a particular card position to determine a Card Type in step 2310 and, implicitly for some I/O Cards, the number of I/O Ports in the I/O Card. If no I/O Card is previously created in the engineering database for that card position, an I/O Card of the appropriate type is defined and the appropriate number of I/O Ports are created in step 2312. If an I/O Card does exist in the engineering database for that card position, but the Card Type in the engineering database does not match the Card Type sensed at the card position, the auto-configure operation generates a graphic notification of the mismatch in step 2314 and interrogates a user to determine whether the engineering database is to be changed to include the sensed Card Type. The Card Type in the engineering database is changed to the sensed Card Type in step 2316 if requested by the user.

Once the Card Type is known, the auto-configuration program interrogates each I/O Port in accordance with the Card Type in step 2318 to determine the Port Type and, if information is available, the number of I/O Devices on the I/O Port. If no I/O Port is previously created in the engineering database for that port address, an I/O Port of the appropriate type is defined and the appropriate number of I/O Devices are created in step 2320. If an I/O Port exists in the engineering database for the Port address, but the Port Type does not match the type of the sensed I/O Port, the user is notified of the mismatch in step 2322, and asked whether the engineering database is to be changed to match the sensed I/O Port in step 2324. The Port Type in the engineering database is changed to the sensed Port Type in step 2326 if requested by the user.

Once the Port Type is known, the auto-configuration program interrogates each I/O Device in accordance with the Port Type in step 2328 to determine the Device Type. If no I/O Device is previously created in the engineering database for that device address, an I/O Device of the appropriate type is defined in step 2330. If an I/O Device exists in the engineering database for the Device address, but the Device Type does not match the type of the sensed I/O Device, the user is notified of the mismatch in step 2332, and asked whether the engineering database is to be changed to match the sensed I/O Device in step 2334. The Device Type in the engineering database is changed to the sensed Device Type in step 2336 if requested by the user.

In step 2338, instrument signal tags (ISTs) are automatically created for primary signal sources on the I/O Ports and I/O Devices, unless an IST already exists with the identical signal source path.

While the invention has been described with reference to various embodiments, it will be understood that these embodiments are illustrative and that the scope of the invention is not limited to them. Many variations, modifications, additions and improvements of the embodiments described are possible. For example, the control logic for performing operations may be implemented as executable program code at any levels including high level languages, assembler languages, and object codes. The control logic may also be implemented as state machines, electronic logic, and the like.

What is claimed is:

1. A process control system comprising:

a process;

a plurality of devices coupled to the process;

a communication network coupled to the devices;

a workstation coupled to the plurality of devices via the network and including a user interface; and a software system executable on the network and implementing a routine for automatically sensing a connection of a device to a network and placing the connected device in [an accessible] *a standby* state for communicating with a user via the user interface *prior to commissioning the connected device into a predefined control configuration* including:

a routine for configuring the connected device in a network control configuration of the plurality of devices, wherein the routine for configuring the connected device further includes:

a user-interactive routine for determining a device type of the connected device;

a user-interactive routine for determining a role of the connected device with respect to the process control system;

a user-interactive routine for assigning a physical device tag the determined role; and a user-interactive routine for verifying connection of the device to the network.

2. A process control system comprising:

a process;

a plurality of devices coupled to the process;

a communication network coupled to the devices;

a workstation coupled to the plurality of devices via the network and including a user interface; and a software system executable on the network and implementing a routine for automatically sensing a connection of a device to a network and placing the connected device in [an accessible] *a standby* state for communicating with a user via the user interface *prior to commissioning the connected device into a predefined control configuration* including:

a routine for configuring the connected device in a network control configuration of the plurality of devices, wherein the routine for configuring the connected device further includes:

a user-interactive routine for initiating calibration of the connected device; and a user-interactive routine for configuring the device within an overall control scheme of the process control system.

3. A process control system comprising:

a process;

a plurality of devices coupled to the process;

a communication network coupled to the devices;

a workstation coupled to the plurality of devices via the network and including a user interface; and a software system executable on the network and implementing a routine for automatically sensing a connection of a device to a network and placing the connected device in [an accessible] *a standby* state for communicating with a user via the user interface *prior to commissioning the connected device into a predefined control configuration*, the software system including:

a routine for commissioning the connected device including:

a user-interactive routine for assigning a physical device tag, a device address, and a device identification to the connected device; and a user-interactive routine for installing a control strategy to the digital device.

4. A control system comprising:

a network;

a plurality of devices coupled to the network;

a distributed controller coupled to the plurality of devices and controlling the plurality of devices according to a defined control configuration, the distributed controller *having standby control logic* including:

a control logic for sensing a device that is connected to the network but not included in the defined control configuration;

a control logic for supplying initial interconnect information to the connected device;

a control logic for uploading configuration parameters from the connected device to the distributed controller; and a control logic for configuring the connected device in the defined control configuration including:

a user-interactive control logic for determining a device type of the connected device;

a user-interactive control logic for determining a role of the connected device with respect to the process control system;

a user-interactive control logic for assigning a physical device tag the determined role; and a user-interactive control logic for verifying connection of the device to the network.

5. A control system comprising:

a network;

a plurality of devices coupled to the network;

a distributed controller coupled to the plurality of devices and controlling the plurality of devices according to a defined control configuration, the distributed controller *having standby control logic* including:

a control logic for sensing a device that is connected to the network but not included in the defined control configuration;

a control logic for supplying initial interconnect information to the connected device;

a control logic for uploading configuration parameters from the connected device to the distributed controller; and a control logic for configuring the connected device in the defined control configuration including:

a user-interactive control logic for initiating calibration of the connected device; and a user-interactive control logic for configuring the device within an overall control scheme of the process control system.

6. A control system comprising:

a network;

a plurality of devices coupled to the network;

a distributed controller coupled to the plurality of devices and controlling the plurality of devices according to a defined control configuration, the distributed controller *having standby control logic* including:

a control logic for sensing a device that is connected to the network but not included in the defined control configuration;

a control logic for supplying initial interconnect information to the connected device;

a control logic for uploading configuration parameters from the connected device to the distributed controller; and a control logic for commissioning the connected device including:

a user-interactive control logic for assigning a physical device tag, a device address, and a device identification to the connected device; and a user-interactive control logic for installing a control strategy to the digital device.

7. A method of configuring a control system comprising:

predetermining a configuration of devices coupled to a network;

sensing a connection to the network of a device that is not included in the predetermined configuration;

assigning the connected device a standby address which allows access to device information and configuration parameters of the connected device;

commissioning the connected device into an operational state in communication with the control system, including:

assigning to the connected device a physical device tag, a device address, and a device identification;

installing a control strategy to the connected device; and placing the connected device in an operational state in communication with the network; and configuring the connected device in combination with the predetermined configuration of devices.

8. An executable program code for performing the method according to claim 7.

9. An article of manufacture comprising a storage storing an executable program code for performing the method according to claim 7.

10. A method of configuring a control system comprising:

predetermining a configuration of devices coupled to a network;

sensing a connection to the network of a device that is not, included in the predetermined configuration;

assigning the connected device a standby address which allows access to device information and configuration parameters of the connected device;

commissioning the connected device into an operational state in communication with the control system; and configuring the connected device in combination with the predetermined configuration of devices, including:

interrogating the connected device to determine a device type;

determining a role of the connected device in the context of the predetermined configuration; and assigning a physical device tag so that the determined role is set.

11. An executable program code for performing the method according to claim 10.

12. An article of manufacture comprising a storage storing an executable program code for performing the method according to claim 10.

13. A method of configuring a control system comprising:

predetermining a configuration of devices coupled to a network;

sensing a connection to the network of a device that is not included in the predetermined configuration;

assigning the connected device a standby address which allows access to device information and configuration parameters of the connected device;

commissioning the connected device into an operational state in communication with the control system; and configuring the connected device in combination with the predetermined configuration of devices, including:

calibrating the connected device.

14. An executable program code for performing the method according to claim 13.

15. An article of manufacture comprising a storage storing an executable program code for performing the method according to claim 13.

16. An executable logic operating in a network for configuring a control system comprising:

means for predetermining a configuration of devices coupled to a network;

means for sensing a connection to the network of a device that is not included in the predetermined configuration;

means for assigning the connected device a standby address which allows access to device information and configuration parameters of the connected device;

means for commissioning the connected device into an operational state in communication with the control system, including:

means for assigning to the connected device a physical device tag, a device address, and a device identification;

means for installing a control strategy to the connected device; and means for placing the connected device in an operational state in communication with the network; and means for configuring the connected device in combination with the predetermined configuration of devices.

17. An article of manufacture comprising a storage storing an implementation of the executable logic according to claim 16.

18. An executable logic operating in a network for configuring a control system comprising:

means for predetermining a configuration of devices coupled to a network;

means for sensing a connection to the network of a device that is not included in the predetermined configuration;

means for assigning the connected device a standby address which allows access to device information and configuration parameters of the connected device;

means for commissioning the connected device into an operational state in communication with the control system; and means for configuring the connected device in combination with the predetermined configuration of devices including:

means for interrogating the connected device to determine a device type;

means for determining a role of the connected device in the context of the predetermined configuration; and means for assigning a physical device tag so that the determined role is set.

19. An article of manufacture comprising a storage storing an implementation of the executable logic according to claim 18.

20. An executable logic operating in a network for configuring a control system comprising:

means for predetermining a configuration of devices coupled to a network;

means for sensing a connection to the network of a device that is not included in the predetermined configuration;

means for assigning the connected device a standby address which allows access to device information and configuration parameters of the connected device;

means for commissioning the connected device into an operational state in communication with the control system; and means for configuring the connected device in combination with the predetermined configuration of devices including:

means for calibrating the connected device.

21. An article of manufacture comprising a storage storing an implementation of the executable logic according to claim 20.

22. A process control system comprising:

a process;

a plurality of devices coupled to the process;

a communication network coupled to the devices;

a workstation coupled to the plurality of devices via the network and including a user interface; and a software system executable on the network and implementing a routine for automatically sensing a connection of a device to a network and placing the connected device in [an accessible] *a standby* state for communicating with a user via the user interface, wherein the devices are field devices selected from devices including pumps, valves, and motors.

* * * * *

UNITED STATES PATENT AND TRADEMARK OFFICE

CERTIFICATE OF CORRECTION

PATENT NO. : RE 40,817 E
APPLICATION NO. : 10/037019
DATED : June 30, 2009
INVENTOR(S) : Kenneth D. Krivoshein et al.

It is certified that error appears in the above-identified patent and that said Letters Patent is hereby corrected as shown below:

At Column 9, line 3, “are” should be -- includes --.

At Column 9, line 4, “refer” should be -- refers --.

At Column 16, line 54, first instance, “devices” should be -- device --.

At Column 16, line 54, second instance, “devices” should be -- device --.

At Column 16, line 55, “will” should be -- that will --.

At Column 17, line 40, “devices” should be -- device --.

At Column 18, line 7, “the fact” should be -- because --.

At Column 18, line 50, “communicates” should be -- communicate --.

Signed and Sealed this

Fifteenth Day of December, 2009

David J. Kappos

David J. Kappos
*Director of the United States Patent and Trademark Office*